US008272938B2

(12) United States Patent
Gilmore et al.

(10) Patent No.: US 8,272,938 B2
(45) Date of Patent: Sep. 25, 2012

(54) GAMING MACHINE WITH WIN MULTIPLIER FEATURE

(75) Inventors: Jason C. Gilmore, Bartlett, IL (US); Bradley A. Rose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 2027 days.

(21) Appl. No.: 10/641,368

(22) Filed: Aug. 14, 2003

(65) Prior Publication Data

US 2005/0037836 A1 Feb. 17, 2005

(51) Int. Cl.
*A63F 13/00* (2006.01)

(52) U.S. Cl. ................ 463/20; 463/16; 463/17; 463/18; 463/19; 463/22; 463/25; 463/26; 463/27

(58) Field of Classification Search .............. 463/16–20, 463/22–27

See application file for complete search history.

(56) References Cited

U.S. PATENT DOCUMENTS

| | | | | |
|---|---|---|---|---|
| 5,980,384 | A * | 11/1999 | Barrie | 463/16 |
| 6,004,207 | A | 12/1999 | Wilson, Jr. et al. | 463/20 |
| 6,089,976 | A * | 7/2000 | Schneider et al. | 463/16 |
| 6,179,711 | B1 | 1/2001 | Yoseloff | 463/25 |
| 6,190,255 | B1 * | 2/2001 | Thomas et al. | 463/20 |
| 6,251,013 | B1 * | 6/2001 | Bennett | 463/13 |
| 6,270,411 | B1 | 8/2001 | Gura et al. | 463/20 |
| 6,309,300 | B1 * | 10/2001 | Glavich | 463/26 |
| 6,311,976 | B1 * | 11/2001 | Yoseloff et al. | 273/138.2 |
| 6,312,334 | B1 | 11/2001 | Yoseloff | 463/25 |
| 6,328,649 | B1 | 12/2001 | Randall et al. | 463/20 |
| 6,443,837 | B1 * | 9/2002 | Jaffe et al. | 463/16 |
| 6,454,651 | B1 | 9/2002 | Yoseloff | 463/25 |
| 6,471,208 | B2 | 10/2002 | Yoseloff et al. | 273/143 R |
| 6,517,432 | B1 | 2/2003 | Jaffe | 463/16 |
| 6,551,187 | B1 | 4/2003 | Jaffe | 463/20 |
| 6,561,904 | B2 | 5/2003 | Locke et al. | 463/25 |
| 6,589,114 | B2 | 7/2003 | Rose | 463/20 |
| 7,258,611 | B2 * | 8/2007 | Bigelow et al. | 463/25 |
| 2002/0025846 | A1 * | 2/2002 | Bennett et al. | 463/20 |
| 2002/0052233 | A1 * | 5/2002 | Gauselmann | 463/20 |
| 2003/0036422 | A1 * | 2/2003 | Baerlocher et al. | 463/20 |
| 2003/0045343 | A1 * | 3/2003 | Luccesi et al. | 463/20 |
| 2003/0054875 | A1 * | 3/2003 | Marks et al. | 463/20 |

* cited by examiner

*Primary Examiner* — Sunit Pandya
(74) *Attorney, Agent, or Firm* — Nixon Peabody LLP

(57) ABSTRACT

A method and apparatus for conducting a wagering game are disclosed. After a player makes a wager, a display depicts a combination of symbols. If the displayed combination yields a predetermined award and meets a predetermined criterion, a win multiplier feature is invoked. In the win multiplier feature the symbols of the combination are associated with respective multipliers, and then the player is prompted to select one of the symbols of the combination. The display reveals the multiplier associated with the selected symbol. The predetermined award is multiplied by the revealed multiplier.

17 Claims, 27 Drawing Sheets

GAMING MACHINE WITH WIN MULTIPLIER FEATURE

FIELD OF THE INVENTION

The present invention relates generally to gaming machines and, more particularly, to a gaming machine with a win multiplier feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent and extended play and hence increase profitability to the operator. Accordingly, in the competitive gaming machine industry, there is a continuing need for gaming machine manufacturers to produce new types of games, or enhancements to existing games, which will attract frequent and extended play by enhancing the entertainment value and excitement associated with the game.

SUMMARY OF THE INVENTION

A method and apparatus for conducting a wagering game are disclosed. After a player makes a wager, a display depicts a combination of symbols. If the displayed combination yields a predetermined award and meets a predetermined criterion, a win multiplier feature is invoked. The predetermined criterion may, for example, be that at least one of the symbols of the combination is a special wild symbol that substitutes for the other symbols in the combination. In the win multiplier feature the symbols of the combination are associated with respective multipliers, and then the player is prompted to select one of the symbols of the combination. The display reveals the multiplier associated with the selected symbol. The predetermined award is multiplied by the revealed multiplier.

The wagering game may, for example, be a video or mechanical reel slot game in which a plurality of symbol-bearing reels are rotated and stopped to place the symbols on the reels in visual association with one or more pay lines. The wagering game may also be any other wagering game, such as video poker, involving the display of a plurality of symbols.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings in which.

Figure 1:
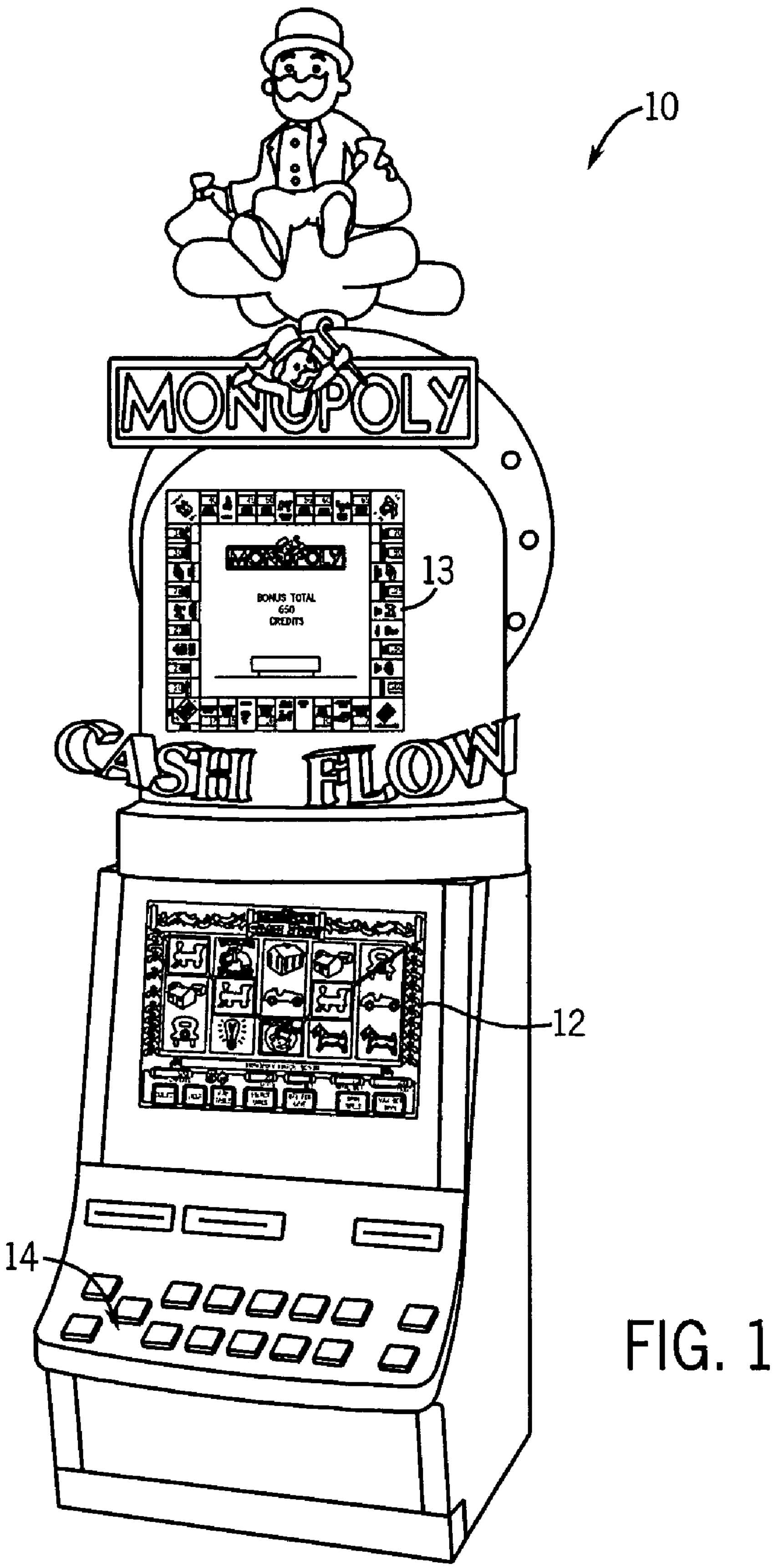
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a wagering game. The wagering game includes a basic video reel slot game and a win multiplier feature triggered by a line pay symbol combination formed with a special Wild Plus symbol. In addition to the win multiplier feature, the basic slot game may produce certain outcomes for triggering other special features and bonus games.

The gaming machine 10 includes a primary visual display 12 preferably in the form of a cathode ray tube (CRT), liquid crystal display (LCD), plasma, or other type of video display known in the art. The display 12 preferably includes a touch screen overlaying the monitor. In the illustrated embodiment, the gaming machine 10 is an “upright” version in which the display 12 is oriented vertically relative to the player. Alternatively, the gaming machine may be a “slant-top” version in which the display 12 is slanted at about a thirty-degree angle toward the player of the gaming machine 10. In addition to the primary display 12, the gaming machine may include a secondary display 13 for depicting certain special features and bonus games.

Figure 2:
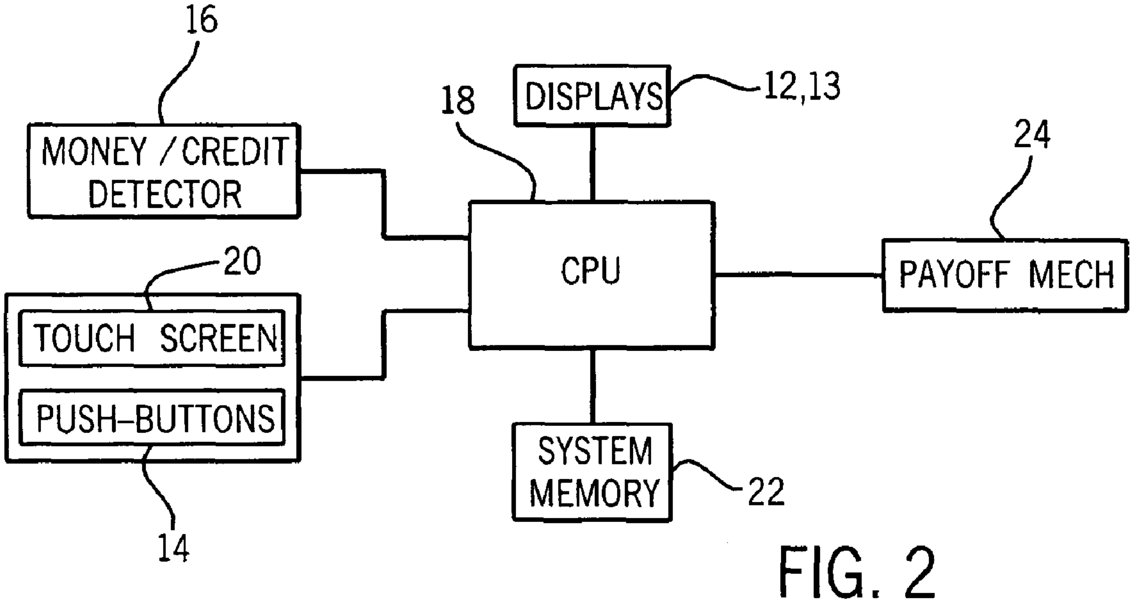
FIG. 2 is a block diagram of a control system suitable for operating the gaming machine.

FIG. 2 is a block diagram of a control system suitable for operating the gaming machine 10. Money/credit detector 16 signals a central processing unit (“CPU”) 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, select an amount to wager on the selected lines, and start game play via the touch screen 20 or the push-buttons 14, causing the CPU 18 to set the reels in motion, randomly select a game outcome, and then stop the reels to display symbols corresponding to the pre-selected game outcome. In accordance with the present invention, a line pay symbol combination formed with a special Wild Plus symbol triggers a win multiplier feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or the win multiplier feature. The payoff may be provided in the form of coins, bills, tickets, coupons, cards, etc. The payoff amounts are determined by one or more pay tables stored in the system memory 22.

Figure 3:
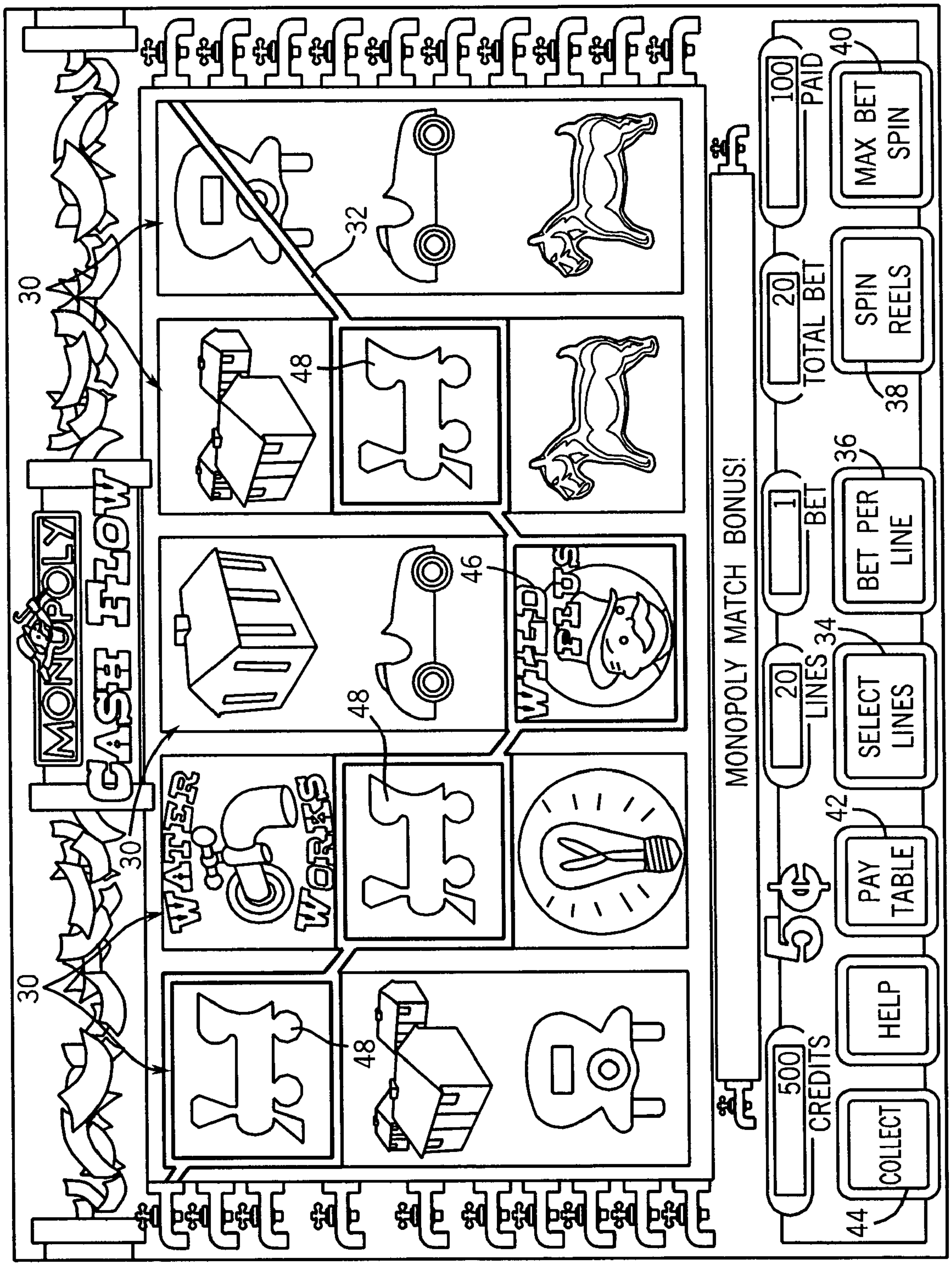
FIG. 3 is a display image associated with a basic slot game and showing a symbol combination for triggering a “first screen” win multiplier feature.

In one embodiment, the gaming machine 10 is operable to play a game entitled Monopoly Cash Flow™ (MONOPOLY is a trademark of Hasbro, Inc. for its property trading game and equipment). Referring to FIG. 3, a basic video slot game is implemented on the display 12 on simulated reels 30 that are rotated and stopped to place symbols on the reels 30 in visual association with a number of pay lines 32. In the illustrated example, the number of reels 30 is five and the number of pay lines 32 is twenty. The number of reels and pay lines may, however, be varied to be more or less than the number illustrated. Also, the video display 12 may be replaced with a mechanical display including a number of physical reels driven by stepper motors. Each of the pay lines 32 extends through one symbol on each of the reels 30.

Generally, game play is initiated by inserting money or playing a number of credits, causing the CPU to activate a number of pay lines corresponding to the amount of money or number of credits played. In one embodiment, the player selects the number of pay lines (between one and twenty) to play by pressing a "Select Lines" key 34. The player then chooses the number of coins or credits to wager on the selected pay lines by pressing a "Bet Per Line" key 36. After selecting a number of pay lines and a wager amount, the reels 30 may be set in motion by touching a "Spin Reels" key 38 or, if the player wishes to bet the maximum amount per line, by using a "Max Bet Spin" key 40. Alternatively, other mechanisms such as a lever or push button may be used to set the reels in motion.

The CPU uses a random number generator to select a game outcome (e.g., "basic" game outcome) corresponding to a particular set of reel "stop positions." The CPU then causes each of the video reels 30 to stop at the appropriate stop position. Video symbols are displayed on the reels 30 to graphically illustrate the reel stop positions and indicate whether the stop positions of the reels represent a winning game outcome.

A pay table identifies winning basic game outcomes (e.g., symbol combinations resulting in an award of credits or a bonus game) and the awards associated with such outcomes. In one embodiment, the pay table is affixed to the machine 10 and/or displayed by the video display 12 in response to a command by the player (e.g., by pressing a "Pay Table" button 42). A winning basic game outcome occurs when the symbols appearing on the reels 30 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game provides the award identified in the pay table for that combination. If the award is a number of credits, the game typically multiplies that number of credits by the number of credits wagered on the winning pay line. The player may collect the amount of accumulated credits by pressing a "Collect" button 44. In the illustrated example, the winning combinations start from the leftmost reel and span adjacent reels, i.e., winning line pay combinations pay left to right only. In an alternative implementation, the winning combinations start from either the leftmost reel or the rightmost reel and span adjacent reels, i.e., winning line pay combinations pay left to right and right to left.

Included among the plurality of basic game outcomes are start-feature outcomes for triggering play of different special game features. The special game features may, for example, include the win multiplier feature and other bonus games. A start-feature outcome may be defined in any number of ways. For example, a start-feature outcome occurs when a special start-feature symbol or a special combination of symbols appears on one or more of the reels 30. The start-feature outcome may require the combination of symbols to appear along an active pay line, or may alternatively require that the combination of symbols appear anywhere on the display (i.e., "scattered") regardless of whether the symbols are along an active pay line. The appearance of a start-feature outcome causes the CPU to shift operation from the basic game to the associated special game feature.

The win multiplier feature is triggered when a Wild Plus symbol 46 completes a winning combination along an active pay line 32. In the illustrated example, the Wild Plus symbol 46 completes a line pay combination of railroad symbols 48. The symbols in the winning combination may, for example, be highlighted using a flashing border.

In alternative embodiments, the Wild Plus symbol 46 is not a prerequisite to triggering the win multiplier feature; other criteria may be used to trigger the feature. Such criteria may, for example, include certain predetermined line pay outcomes, outcomes along particular pay lines, outcomes containing a particular number of symbols, certain predetermined scatter pay outcomes, combinations of the foregoing criteria, etc. To add an element of surprise, the win multiplier feature need not be triggered every time the criteria is met-if the criteria is met, the CPU may randomly determine whether or not to trigger the win multiplier feature.

Figure 4:
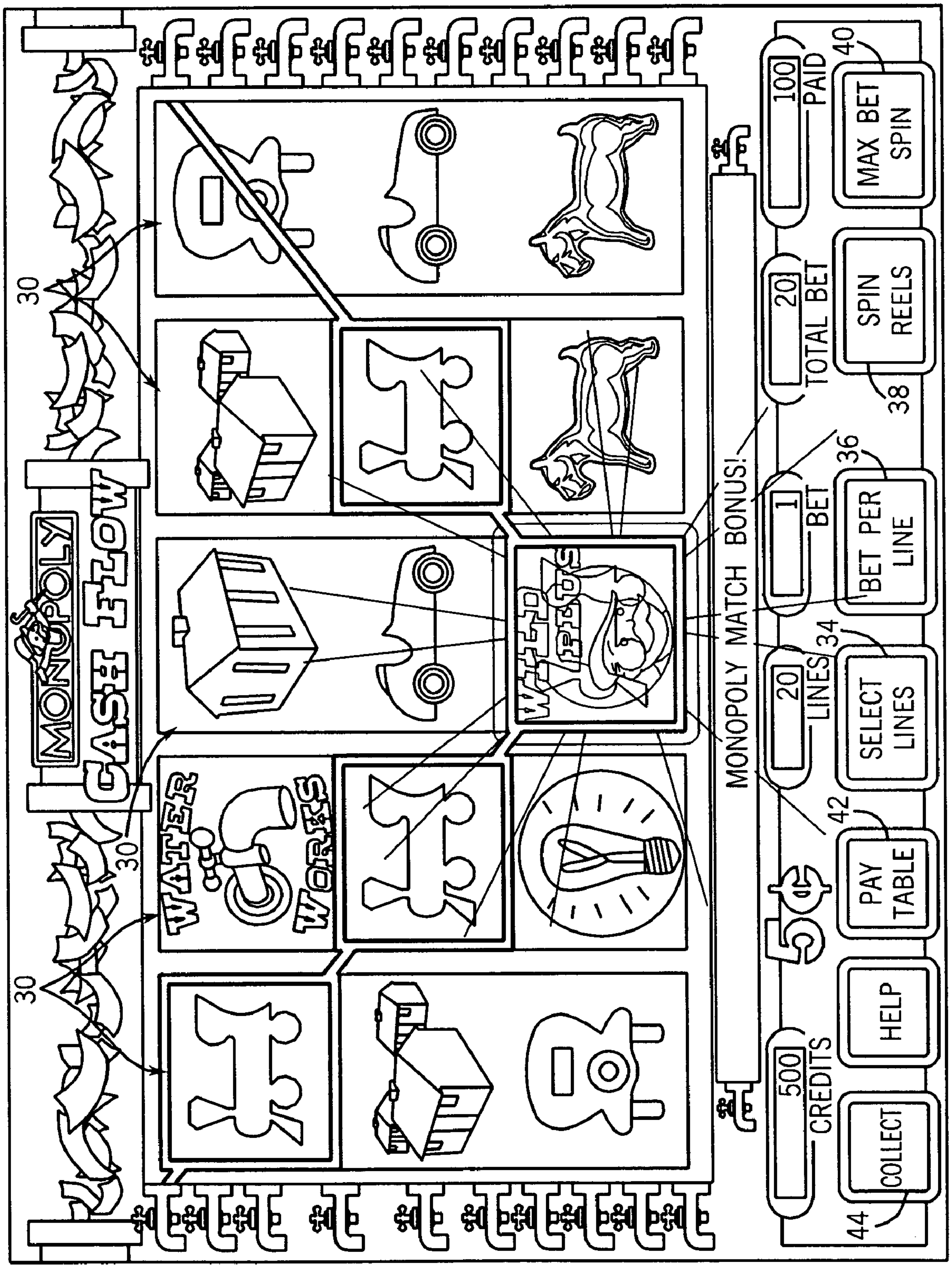
FIGS. 4 through 6 are display images associated with the win multiplier feature.

Referring to FIG. 4, the Wild Plus symbol 46 transforms into the winning combination's symbol which, in this case, is a railroad symbol 48. At the commencement of the win multiplier feature, the symbols 48 (including the transformed symbol 46) of the winning combination are associated with respective multipliers for multiplying the pay table's standard payout for that combination. The multipliers may, for example, range from 2× to 5×. The CPU may randomly select the multipliers to be associated with the respective symbols 48 from a weighted or unweighted table.

Figure 5:
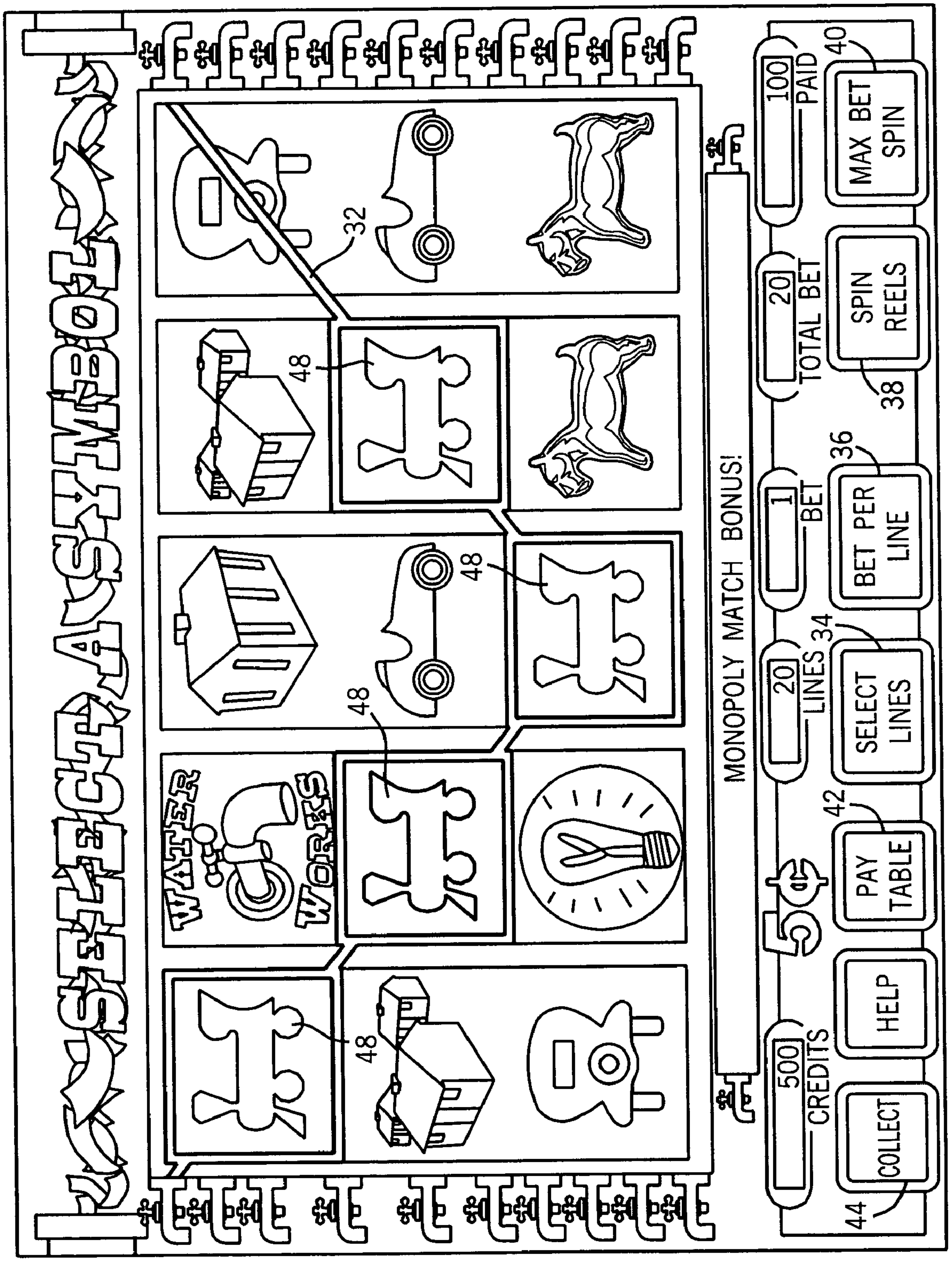

Referring to FIG. 5, the player is then prompted to select one of the highlighted symbols 48 from the winning combination.

Figure 6:
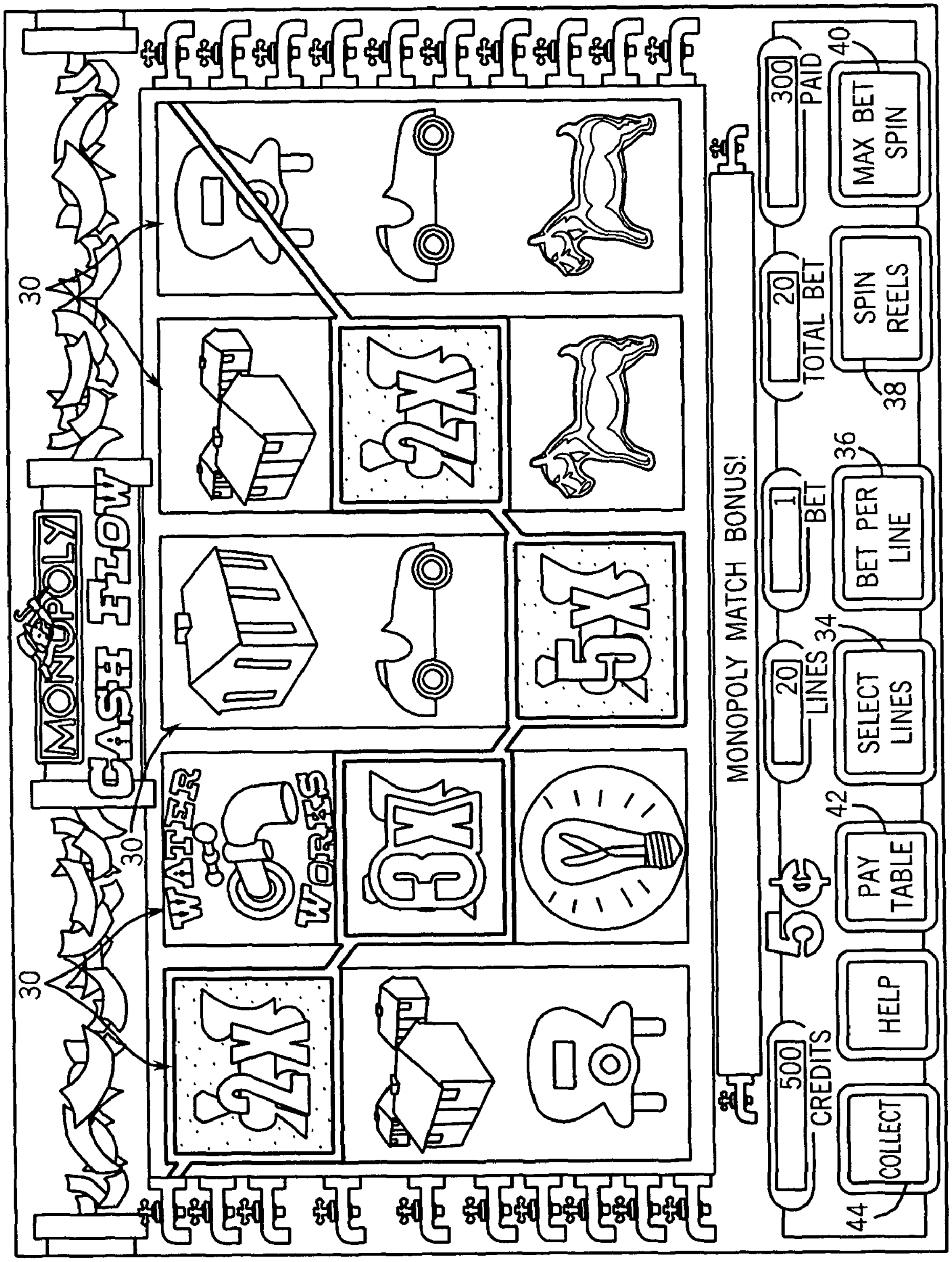

Referring to FIG. 6, the selected symbol reveals a multiplier that multiplies the standard payout for the winning combination. In the illustrated example, the selected symbols reveals a 3× multiplier. Therefore, if the standard payout in the pay table for a winning combination of four railroad symbols 48 is 100 credits for each credit wagered along the winning pay line, then this standard payout is multiplied by 3 for a total payout of 300 credits (for each credit wagered along the winning pay line). After the player selects one of the symbols in the winning combination, the unselected symbols also reveal the multipliers that they would have awarded had the player selected one of those symbols.

Figure 7:
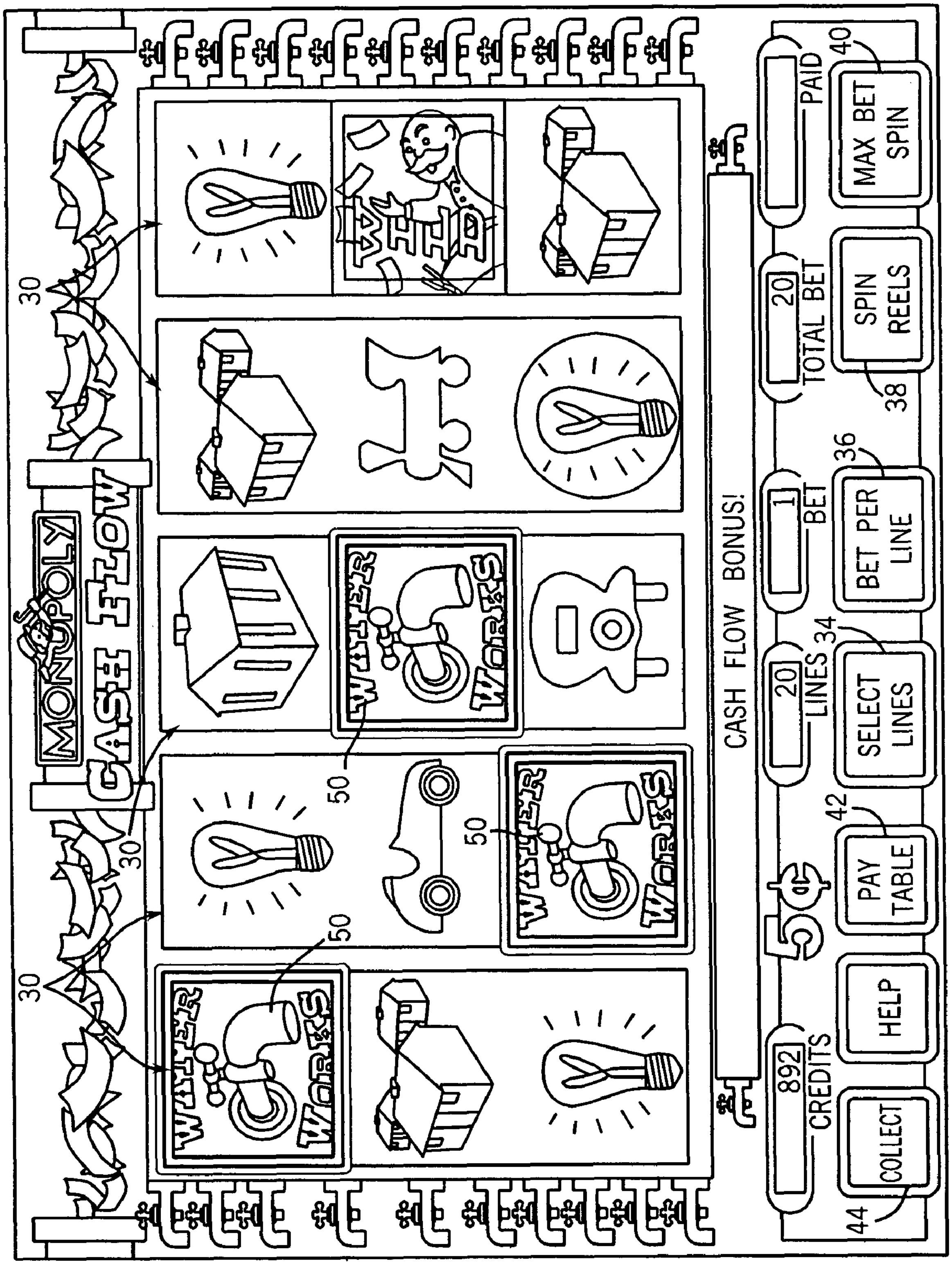
FIG. 7 is a display image associated with the basic slot game and showing a symbol combination for triggering a “second screen” “Cash Flow” bonus game.
Figure 8:
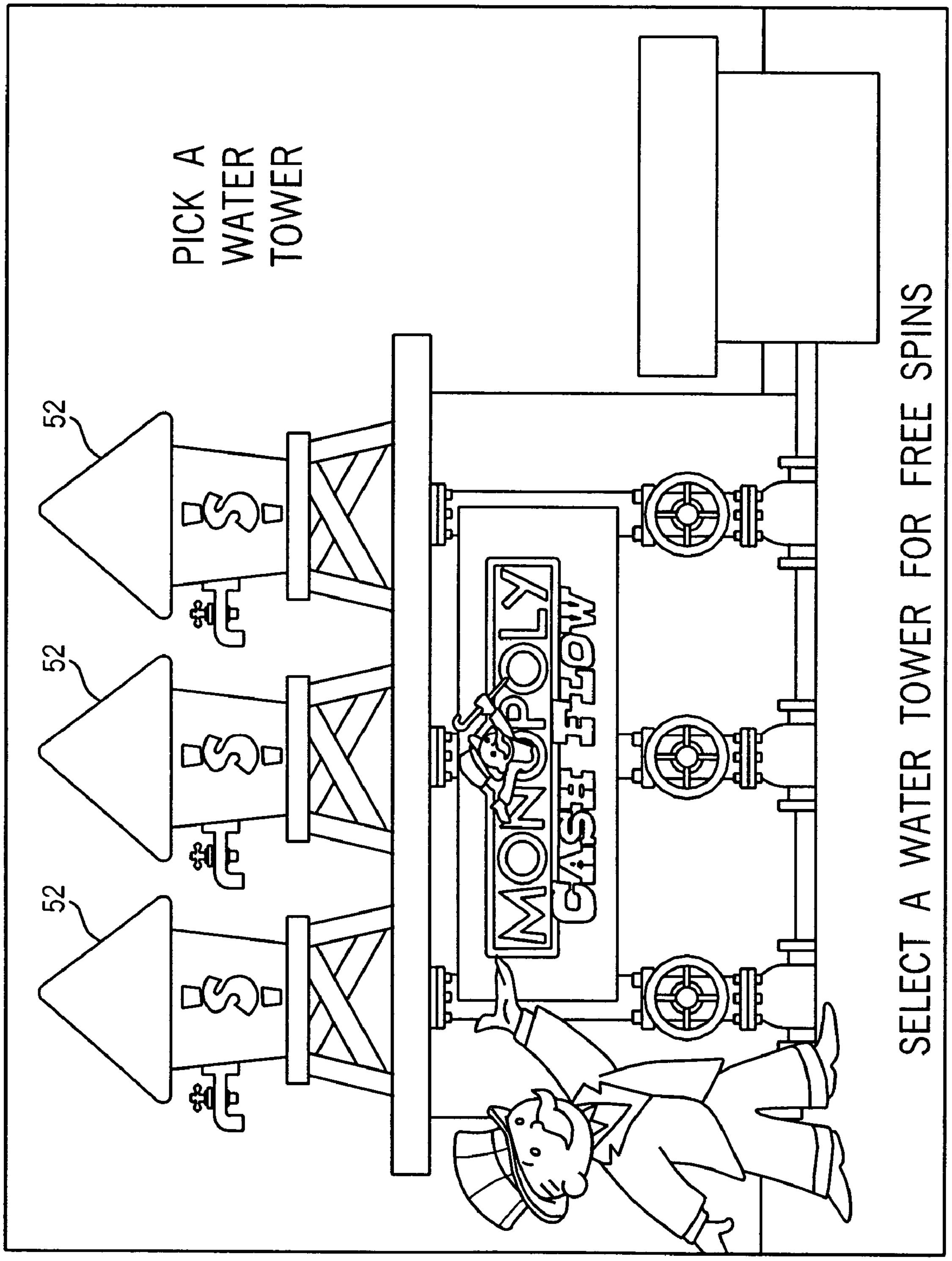
FIGS. 8 through 27 are display images and views associated with the “Cash Flow” bonus game.
Figure 9:
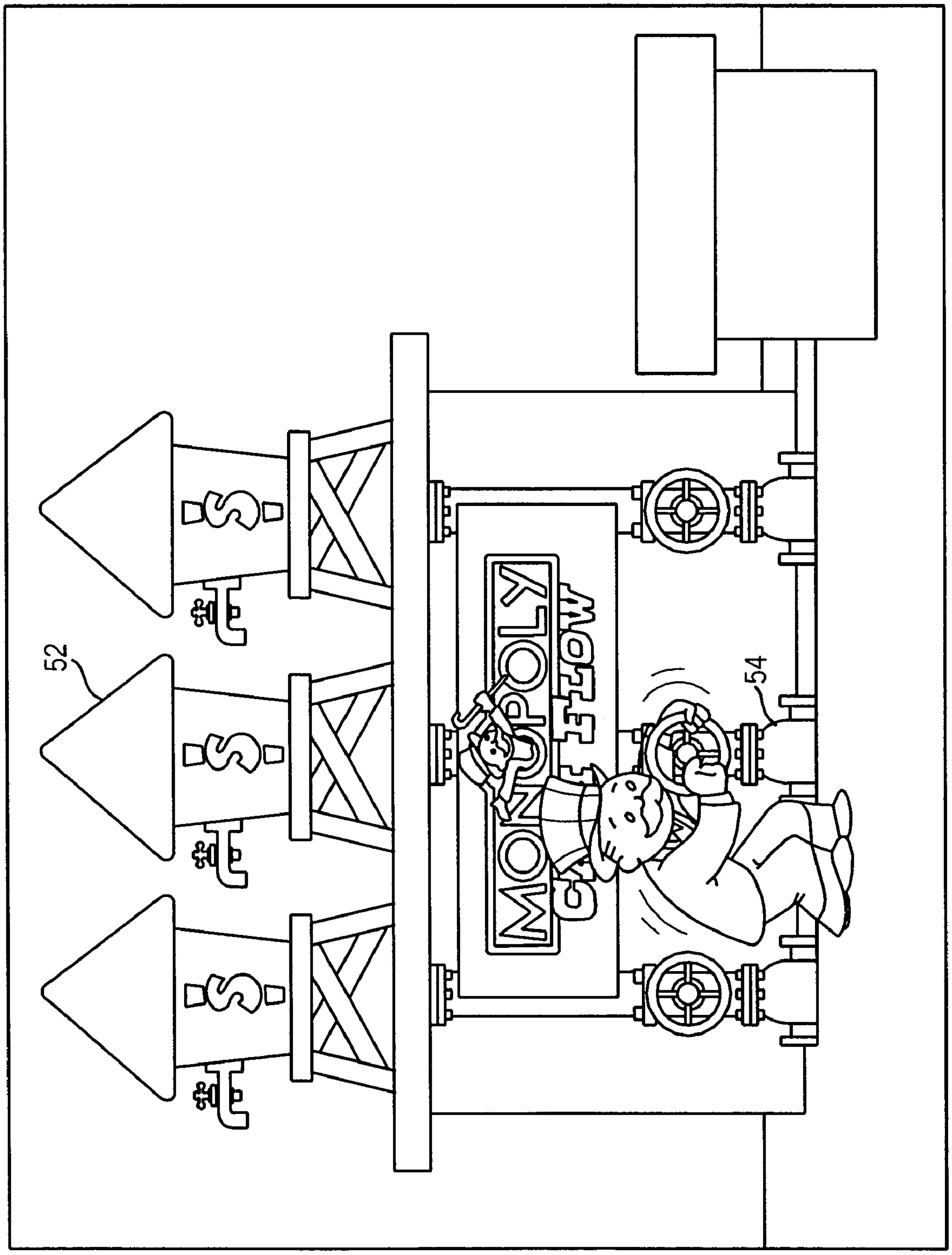
Figure 11:
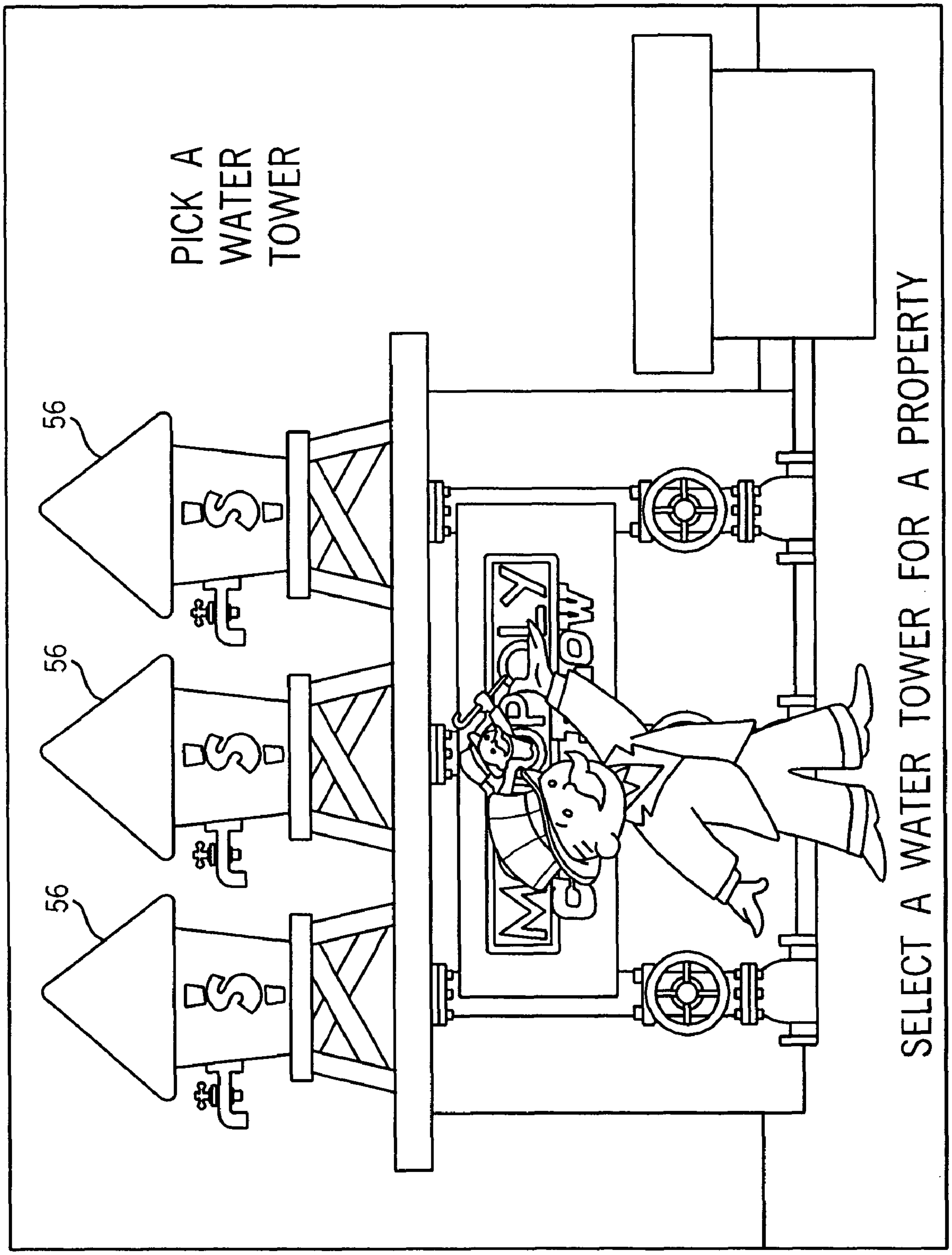
Figure 12:
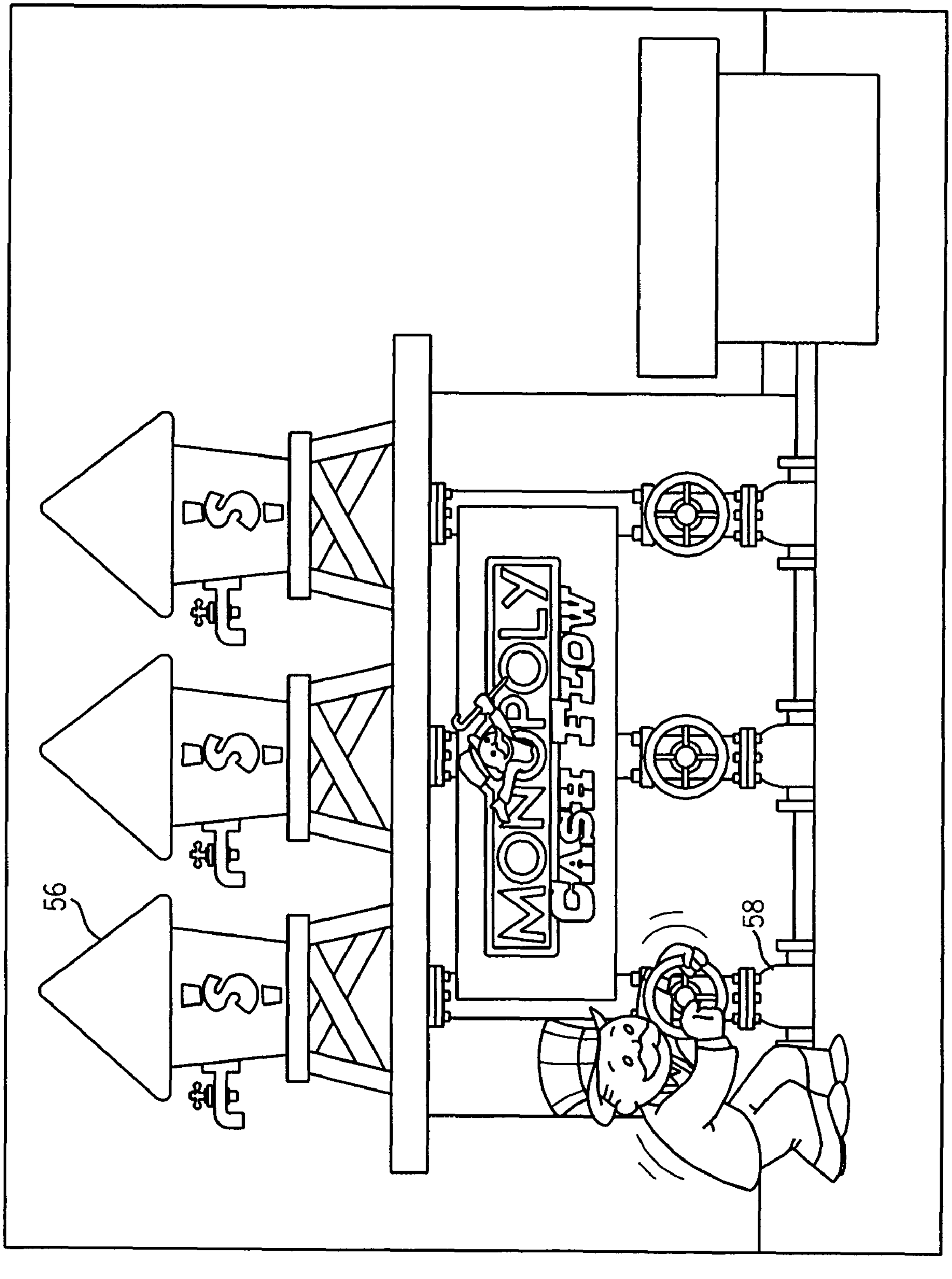
Figure 13:
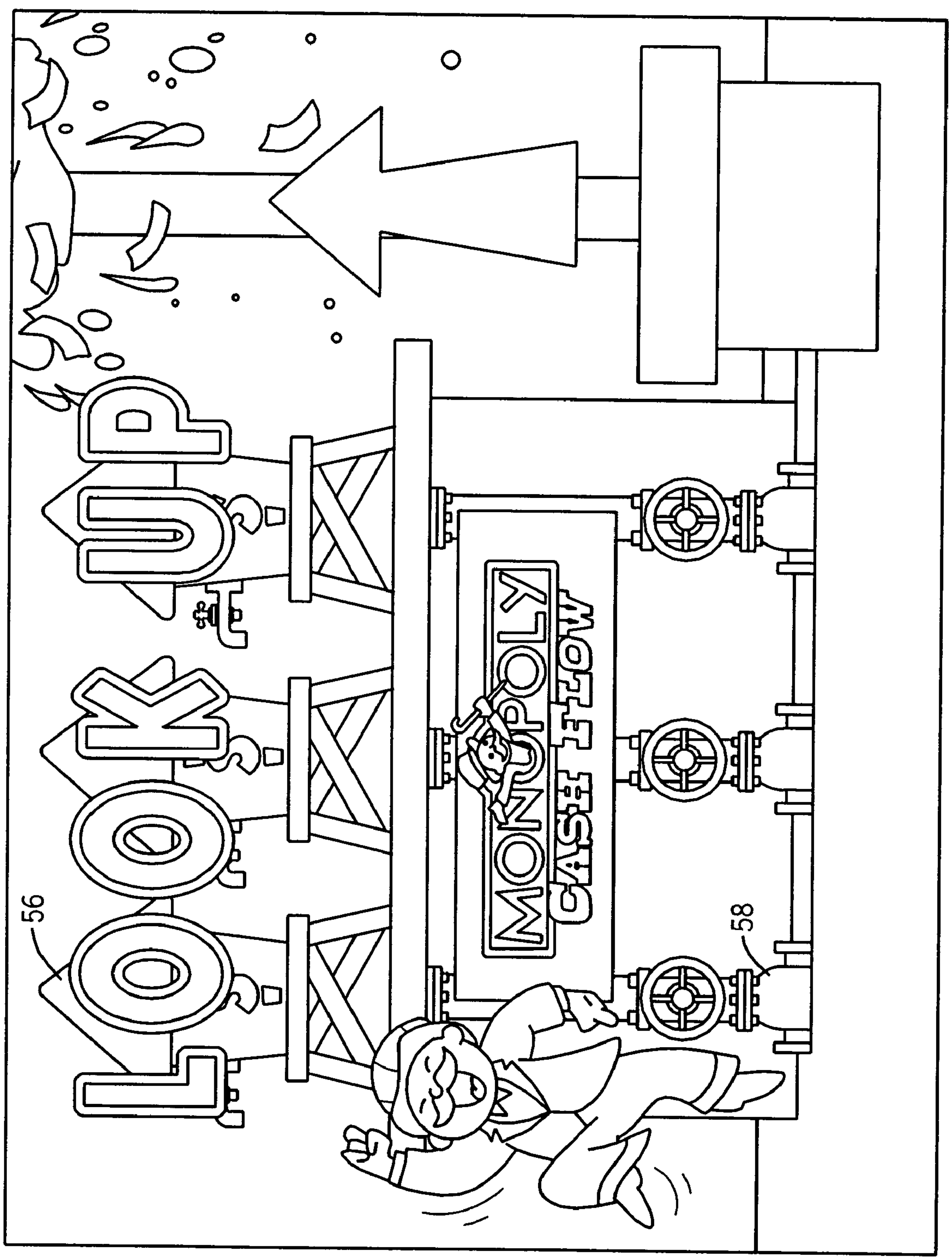
Figure 14:
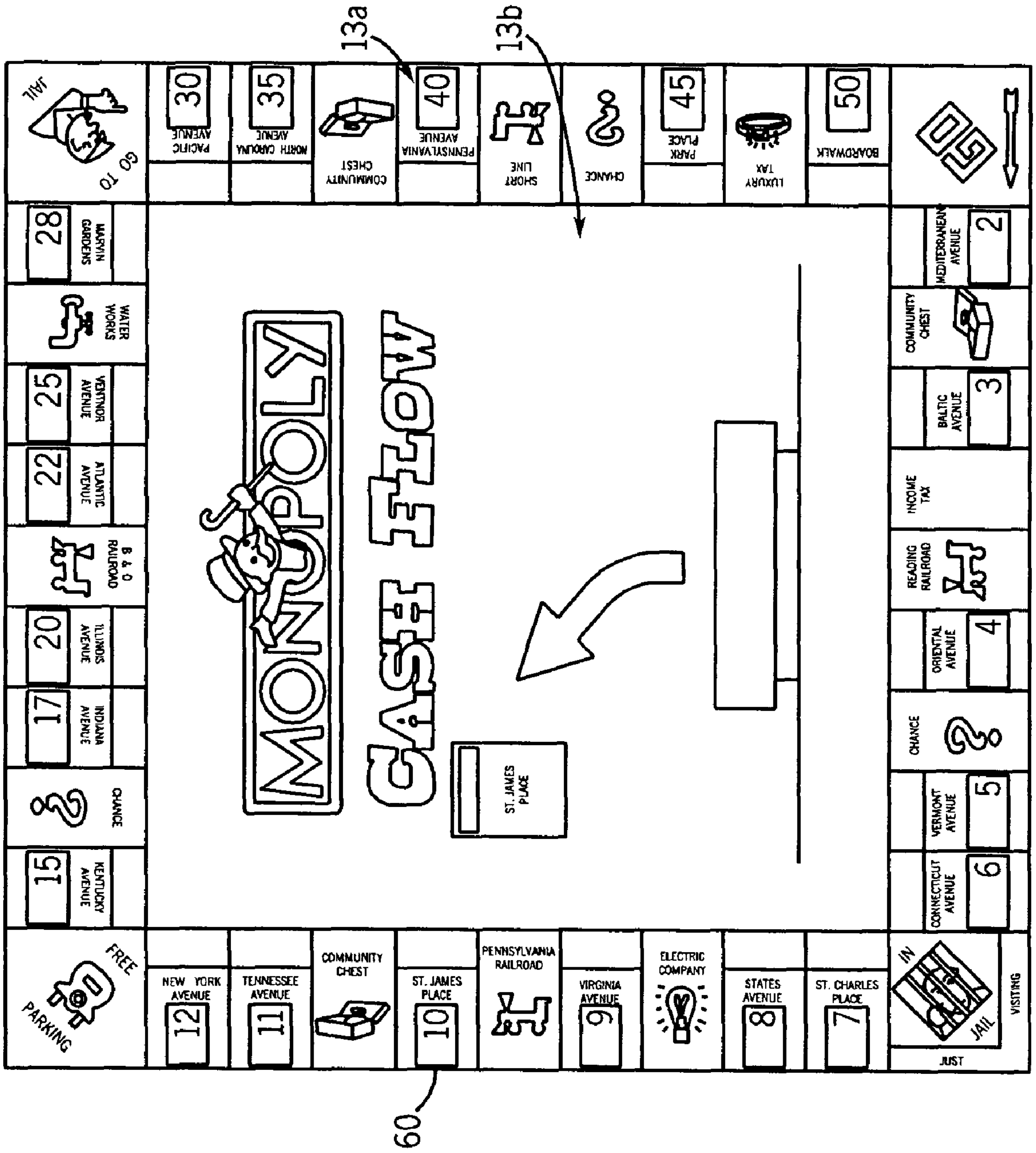

As noted above, other special features and bonus games may be triggered by other start-bonus outcomes that occur in the basic slot game. Referring to FIG. 7, three scattered Water Works symbols 50 triggers a "Cash Flow" bonus game. The image on the screen transforms to what is shown in FIG. 8. Referring to FIG. 8, the player is prompted to select one of three water towers 52 to reveal a number of free spins of the reels. Referring to FIG. 9, here the player selects the middle water tower 52. Mr. Monopoly opens the corresponding valve 54 which, according to FIG. 10, awards five free spins of the reels. Referring to FIG. 11, the player is then prompted to select one of three new water towers 56 to reveal a property selected from the properties commonly associated with the MONOPOLY trading game. Referring to FIG. 12, here the player selects the left water tower 56, and Mr. Monopoly opens the corresponding value 58. Referring to FIGS. 13 and 14, the player is prompted to look up at the secondary display 13 (shown in FIG. 14) as the property (in this case, "St. James Place") is awarded to the player.

The secondary display 13 generally includes a Monopoly game board 13*a* encompassing an interior video display 13*b*. The game board is printed on a backlit glass panel. Each property on which houses/hotels can be built reveals a respective LED meter 60, which indicates the current value in credits of the associated property. The LED meter 60 is mounted behind its associated property. In an alternative embodiment, the game board 13*a* is part of the video display 13*b* such that the game board 13*a* is a video image instead of a printed panel. In the illustrated example, the LED meter 60 for St. James Place indicates that this property is initially worth 10 credits. The value of the property may, however, increase before the end of the bonus game.

Figure 10:
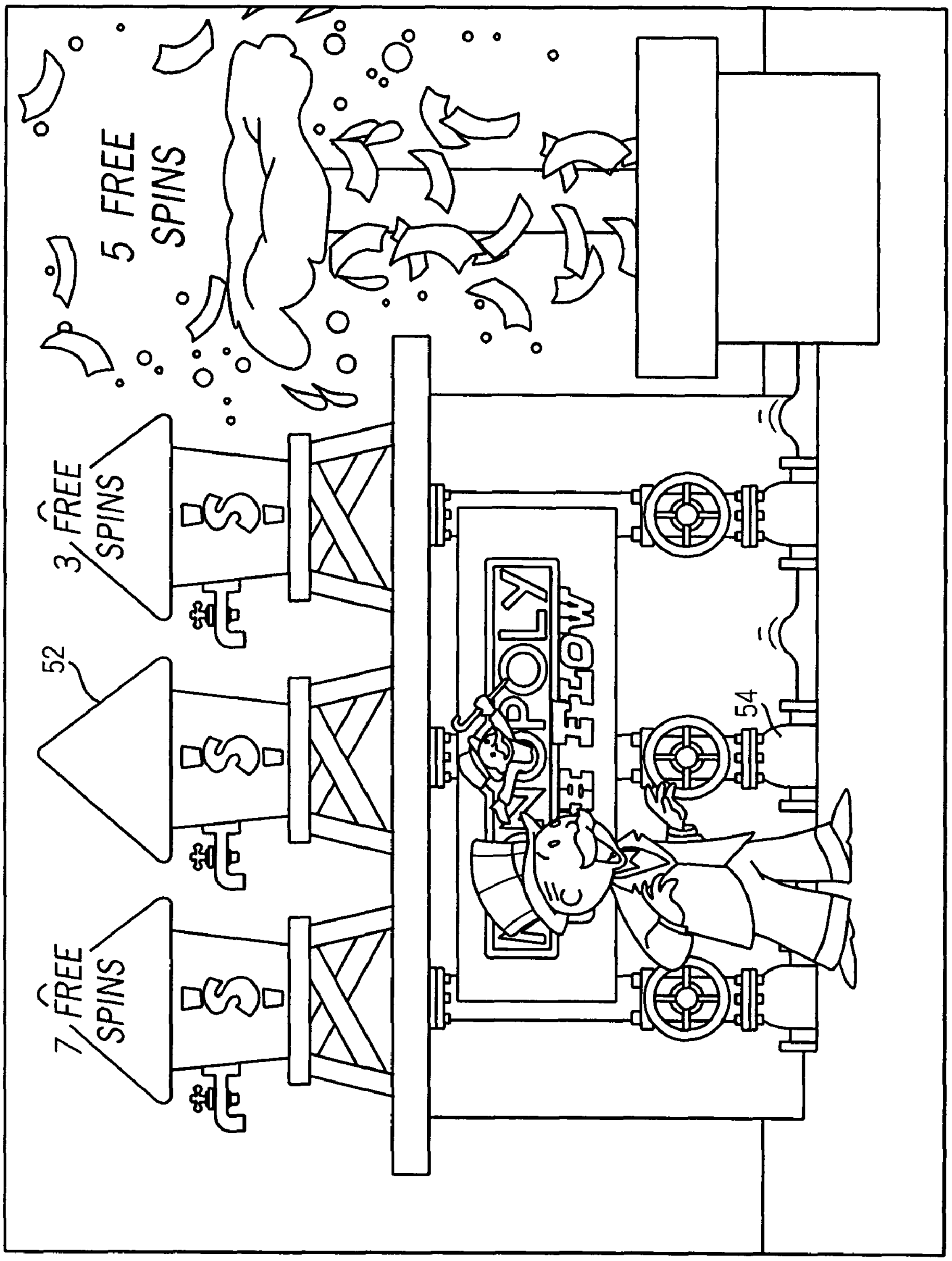
Figure 15:
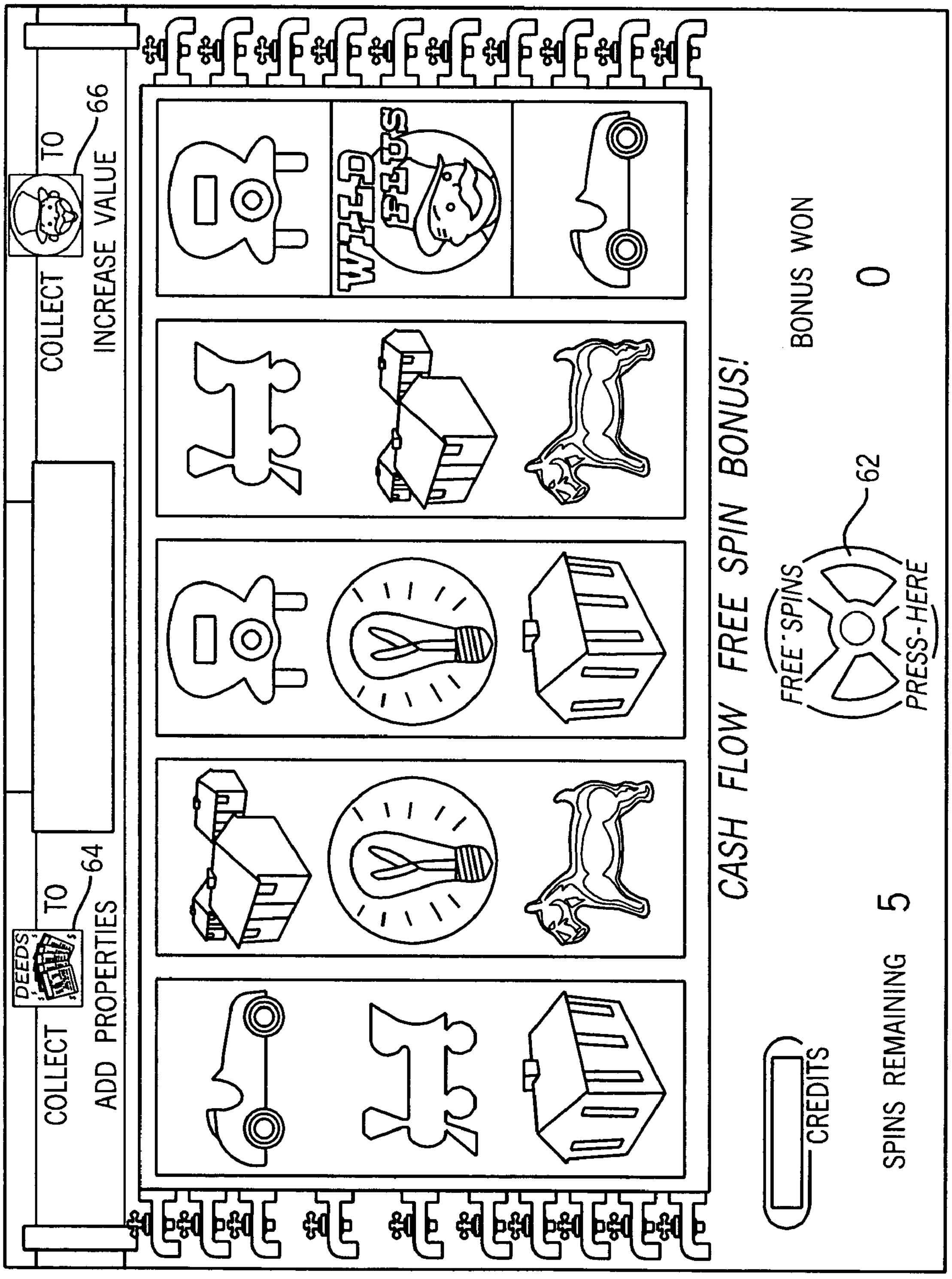

Referring to FIG. 15, the bonus game proceeds with the free reel spins awarded in connection with FIG. 10. The player uses the free spins to attempt to collect more properties on the game board (due to the appearance of Deeds symbols 64) and to increase the credit values of the properties (due to the appearance of Mr. Monopoly symbols 66). During the free spins, the player is also paid for any winning combinations (e.g., line pays and scatter pays) identified by the standard pay table. To commence the free spins, the player is prompted to press an onscreen button 62.

Figure 16:
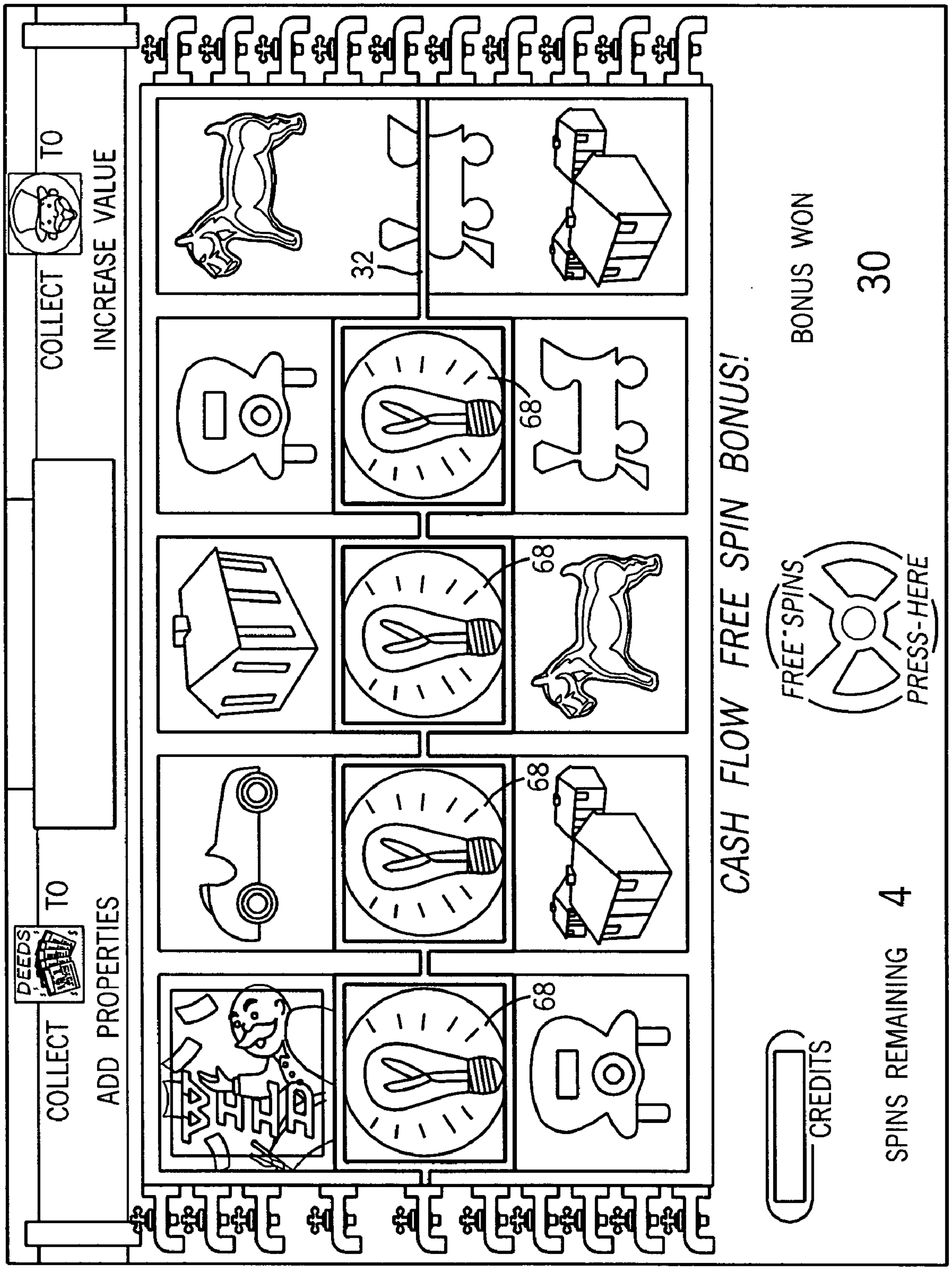

Referring to FIG. 16, here the first free spin yields a winning combination of four Electric Company symbols 68 along a pay line 32. This line pay awards 30 credits.

Figure 17:
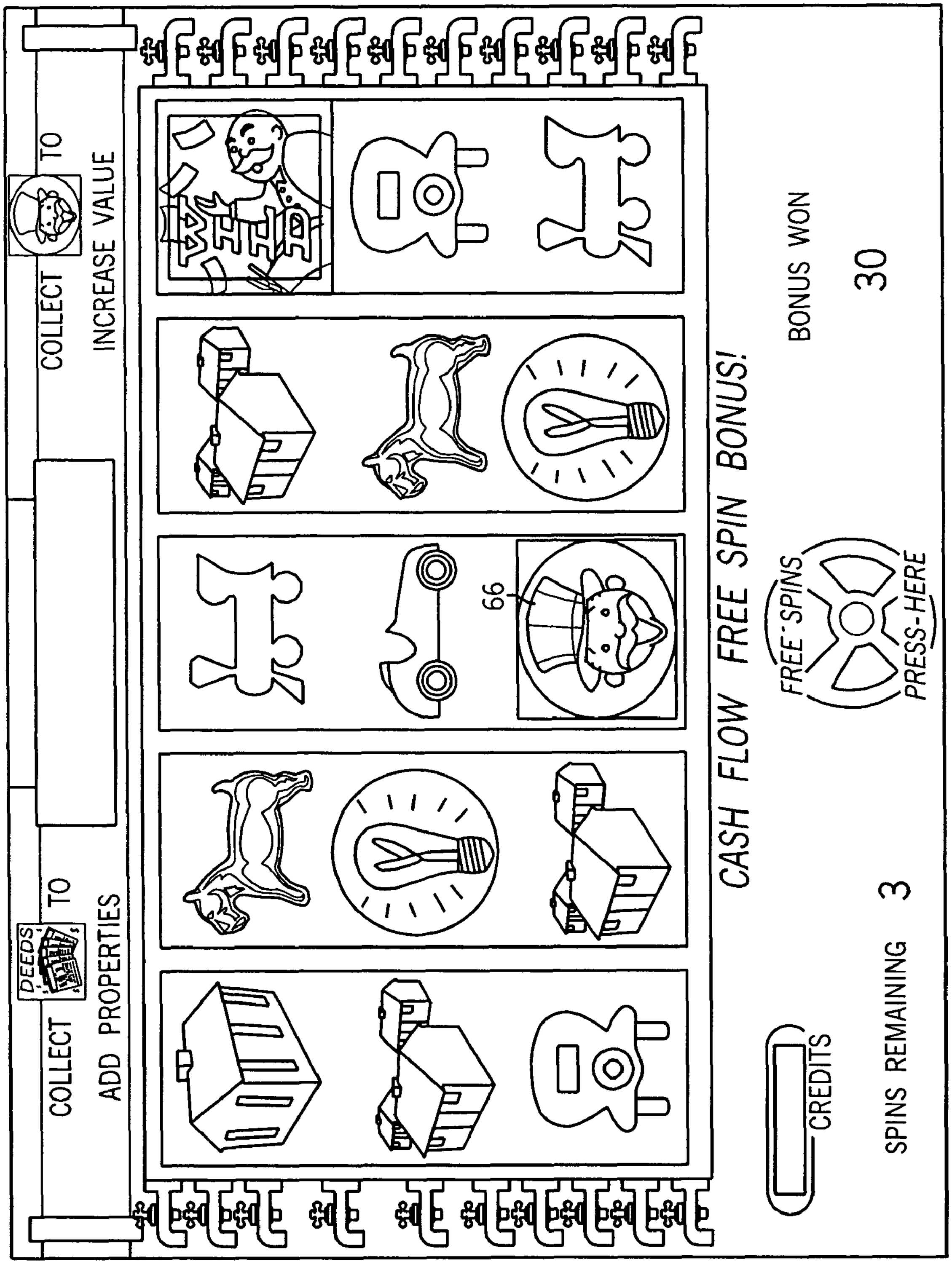
Figure 18:
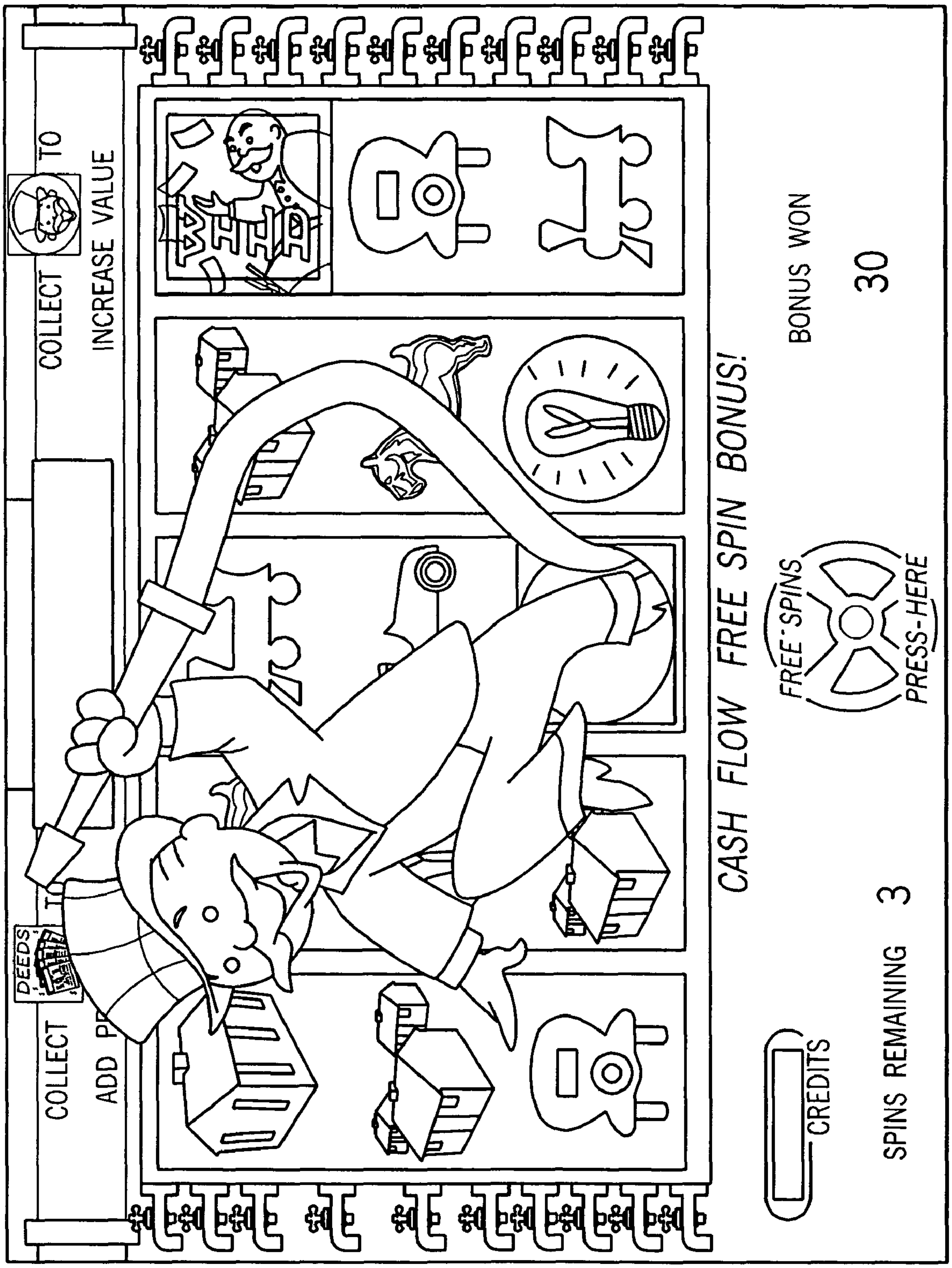
Figure 19:
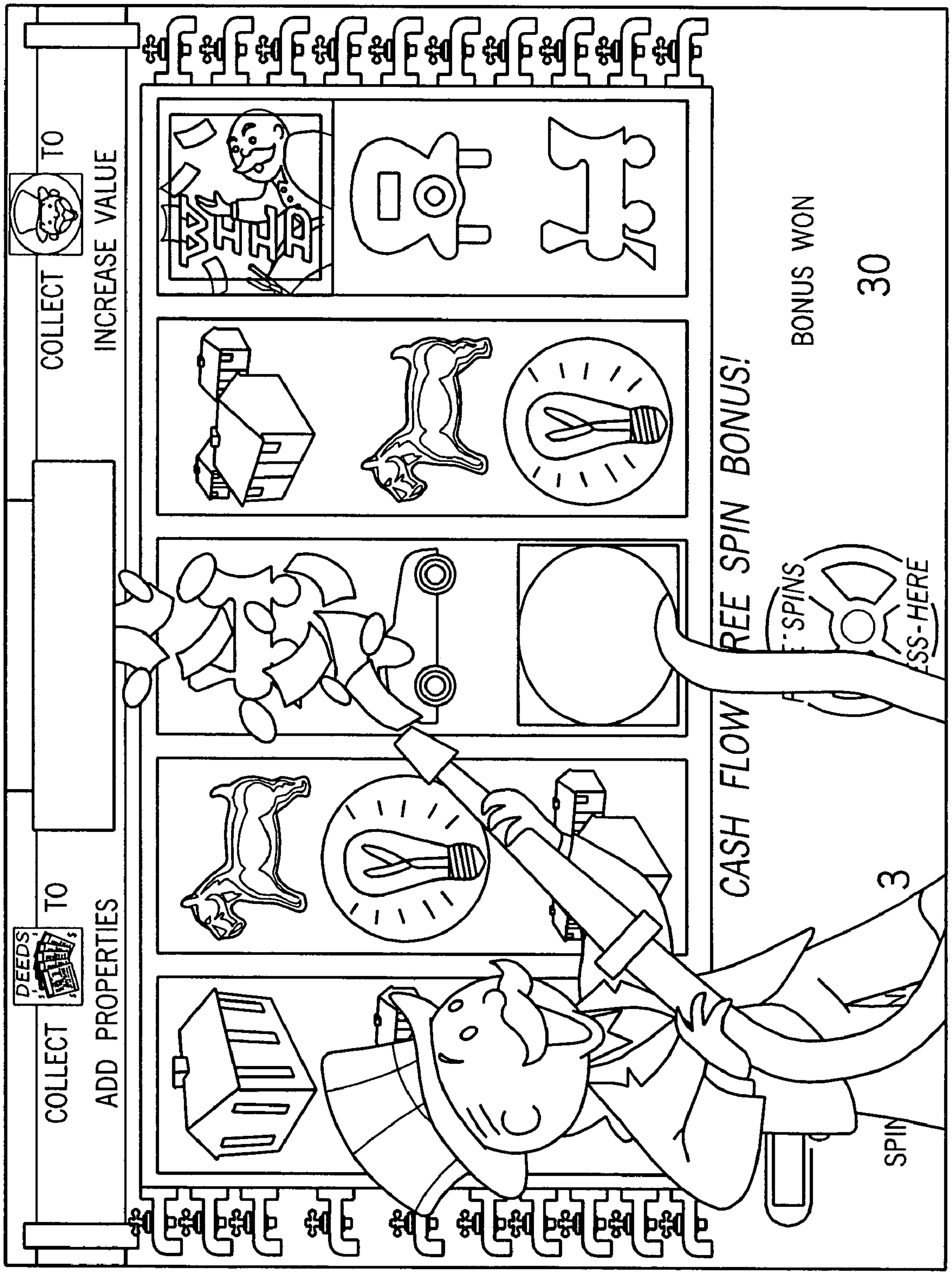
Figure 20:
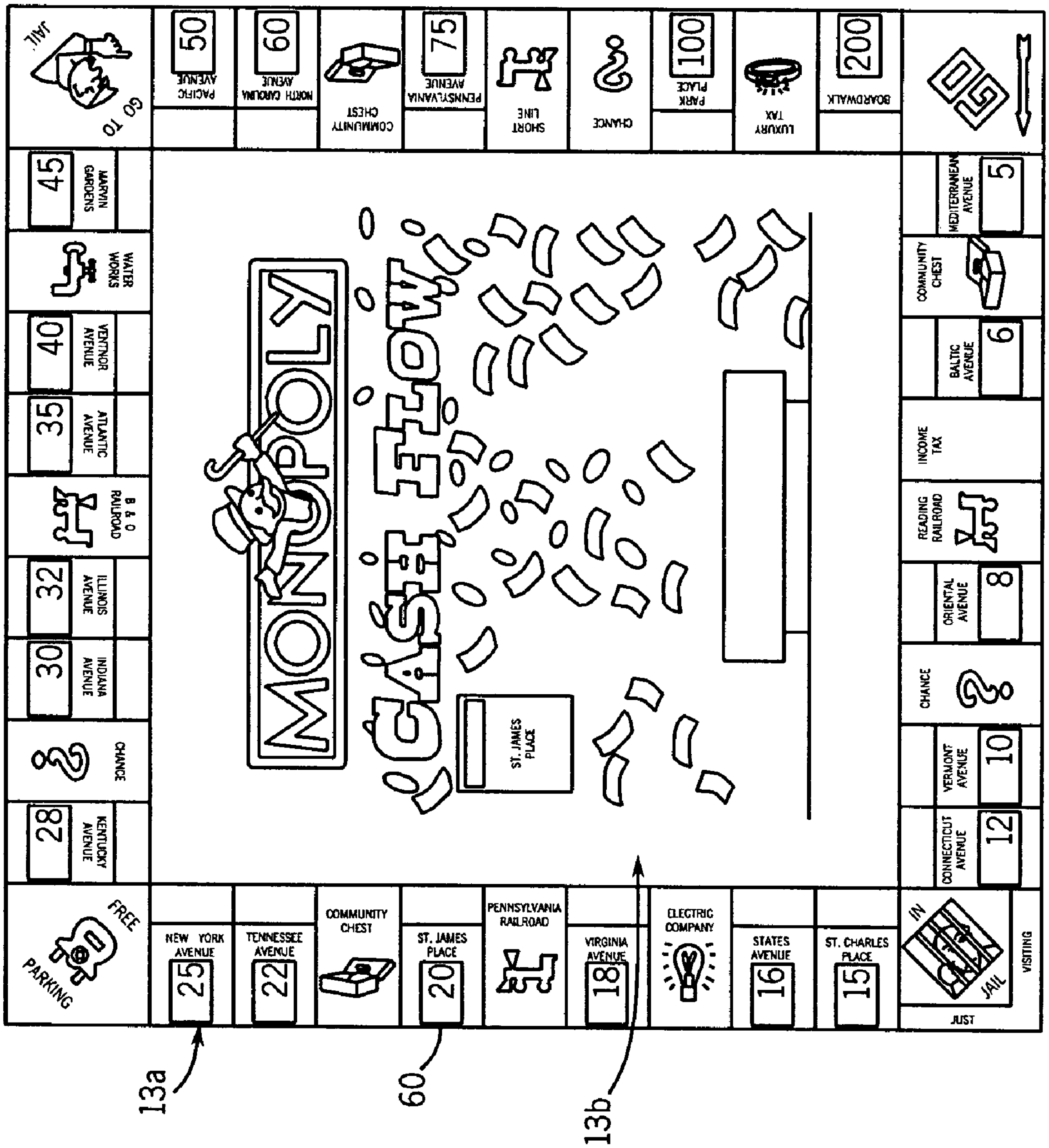

Referring to FIG. 17, the second free spin does not yield any winning combinations, but rather yields a Mr. Monopoly symbol 66 on the third reel. Referring to FIGS. 18 and 19, Mr. Monopoly "jumps out" of this symbol position and "sends" money up to the secondary display 13 in FIG. 20, thereby increasing the credit values of all the properties (including any properties previously collected by the player). St. James Place, for example, is now worth 20 credits according to its LED meter 60.

Figure 21:
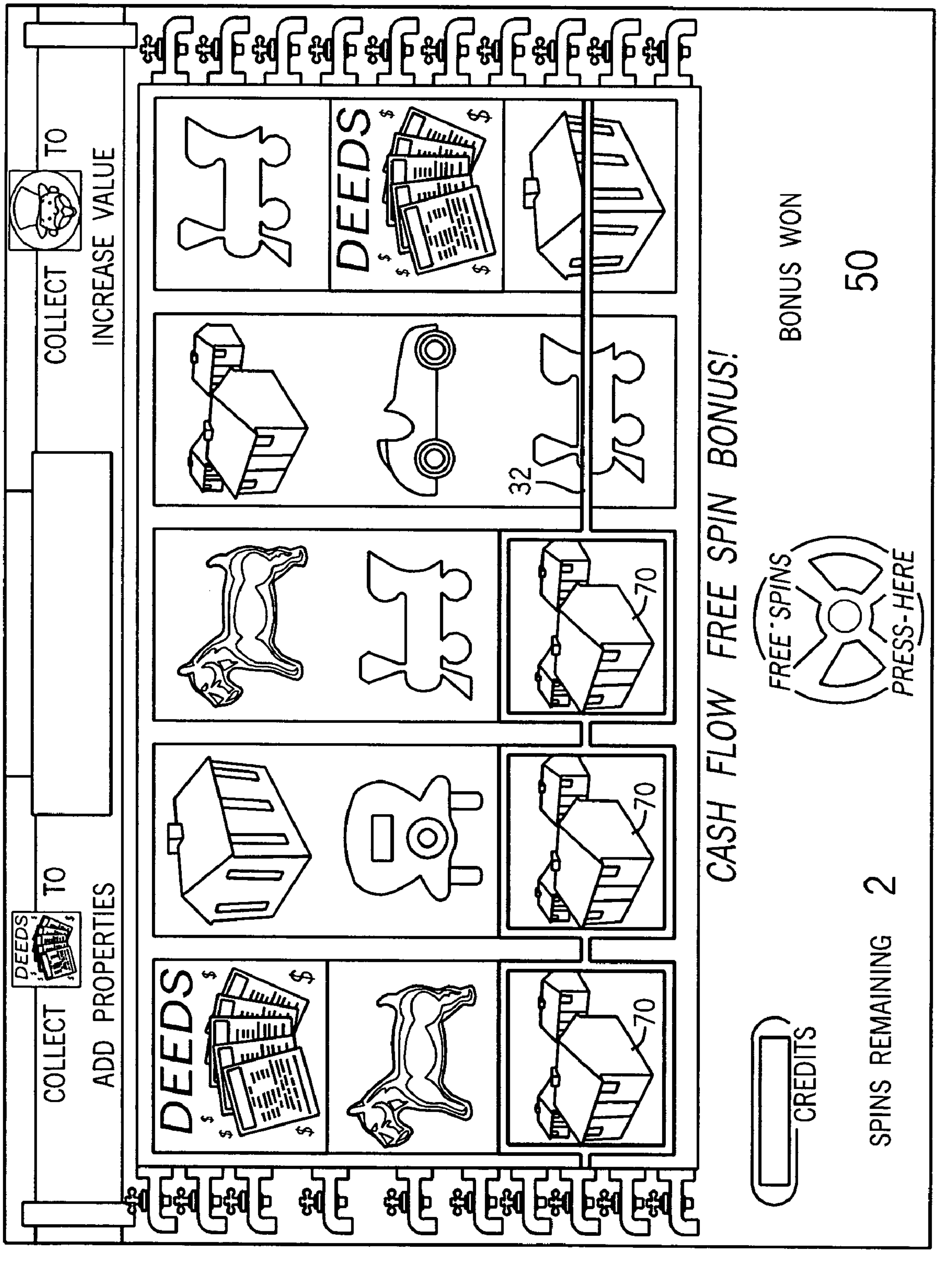
Figure 22:
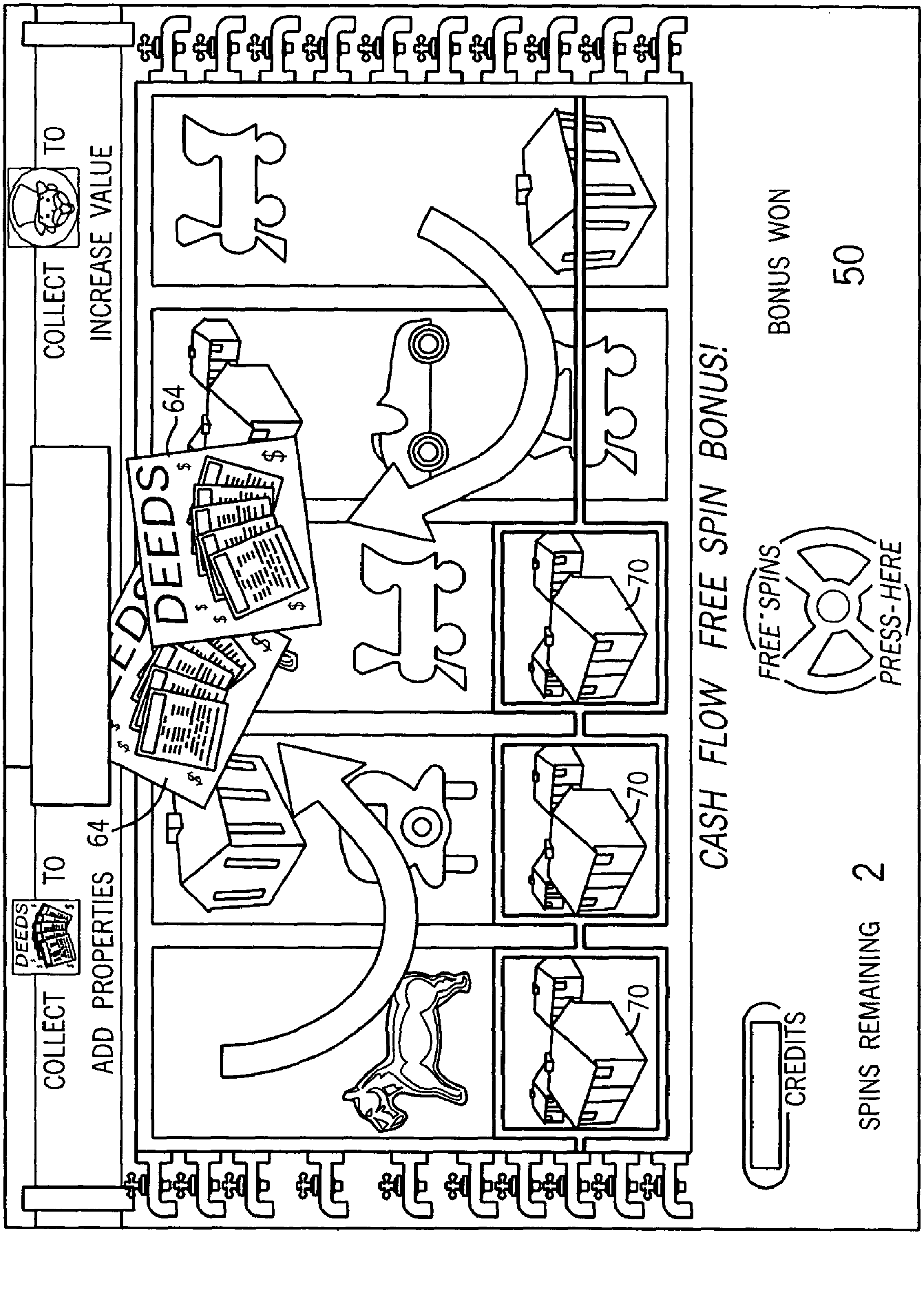
Figure 23:
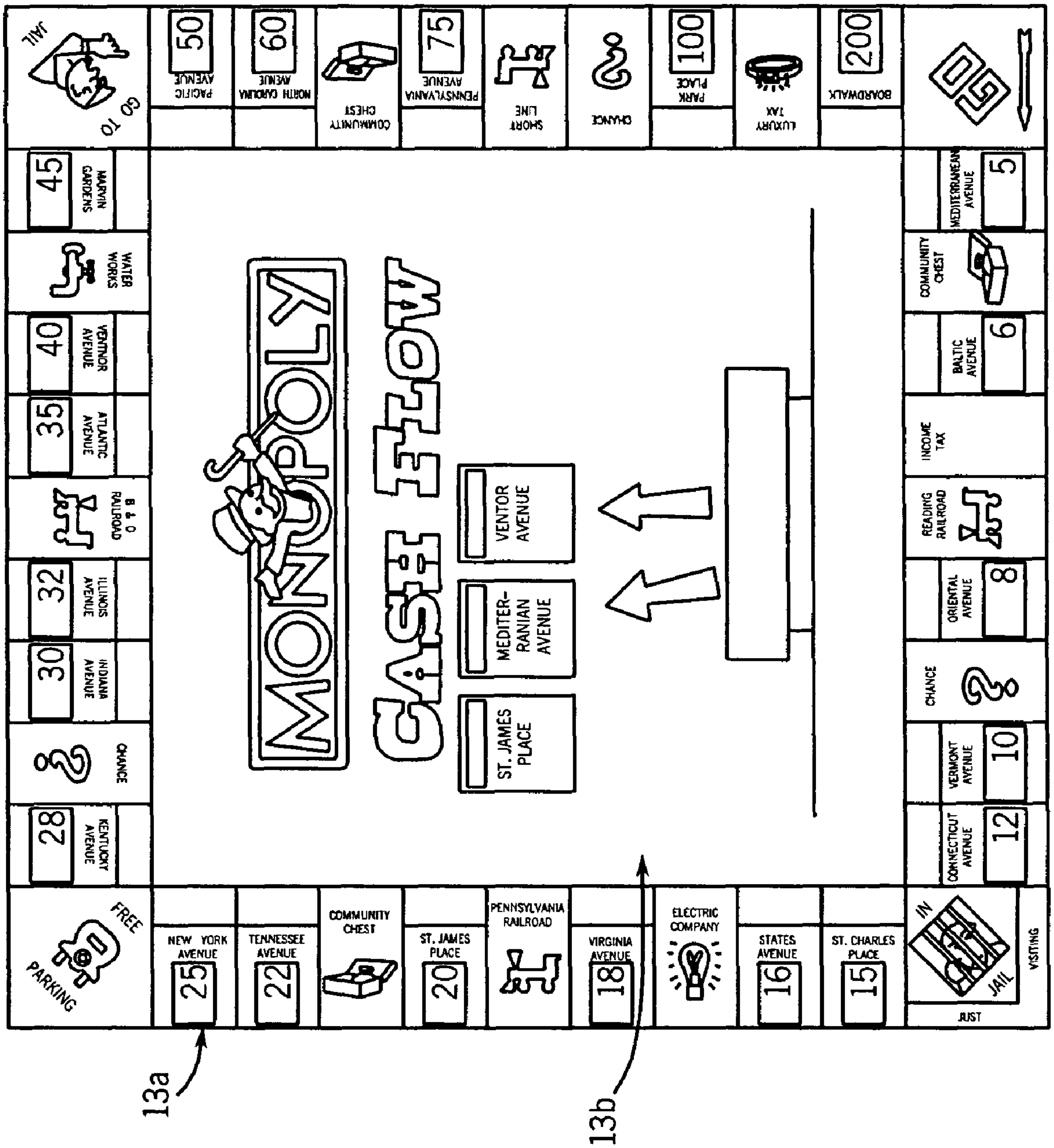

Referring to FIG. 21, the third free spin yields a winning combination of three House symbols 70 along a pay line 32. This line pay awards 20 credits. The third free spin also yields two Deeds symbols 64. Referring to FIG. 22, the Deeds symbols 64 "move up" to the secondary display 13 in FIG. 23 and randomly award a pair of properties, one for each Deeds symbol 64. Here, the player has been awarded Ventor Avenue and Mediterranean Avenue. The awarded properties are shown on the video display 13*b* and highlighted on the game board 13*a*. Two free spins still remain.

Figure 24:
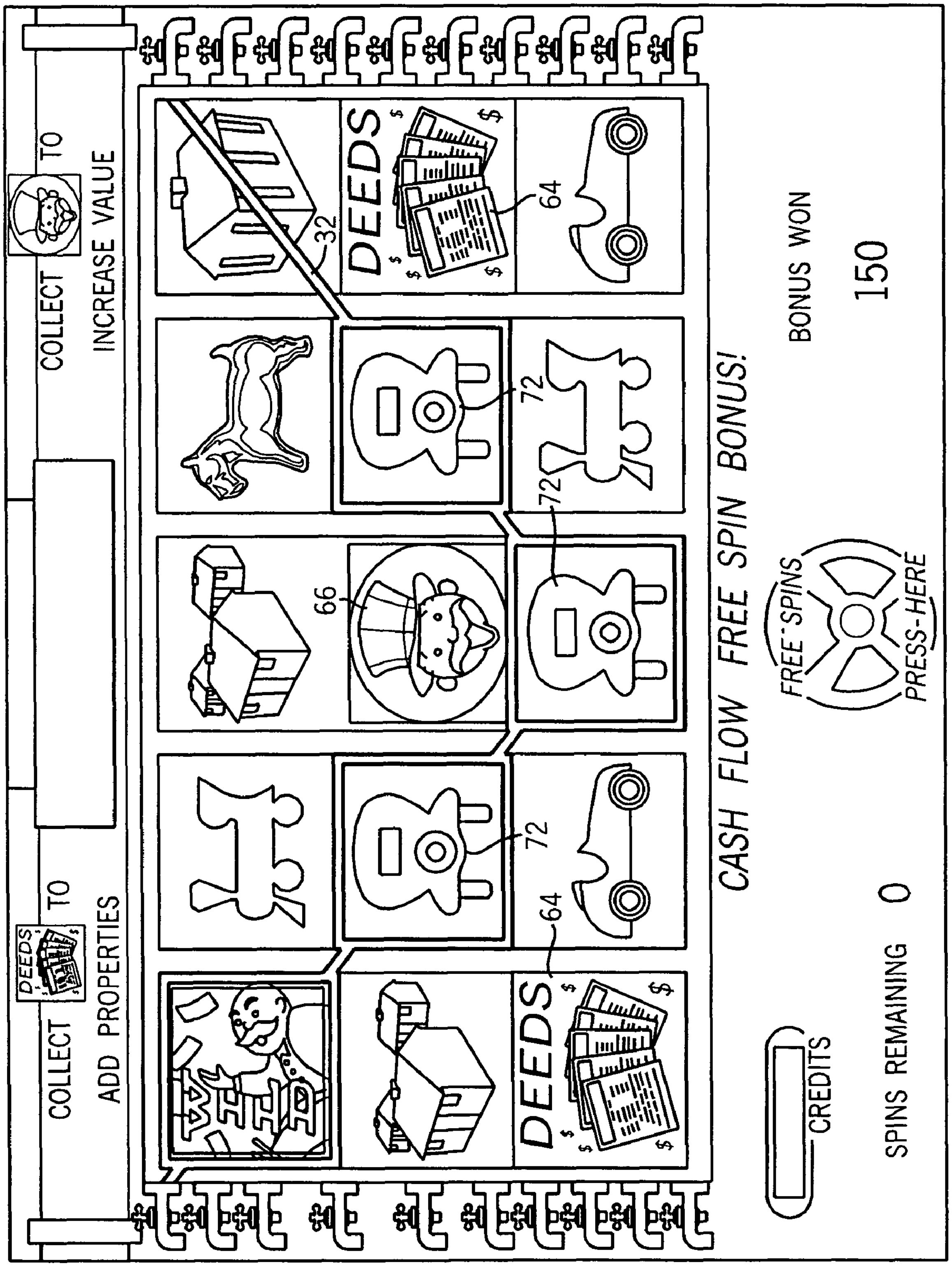
Figure 25:
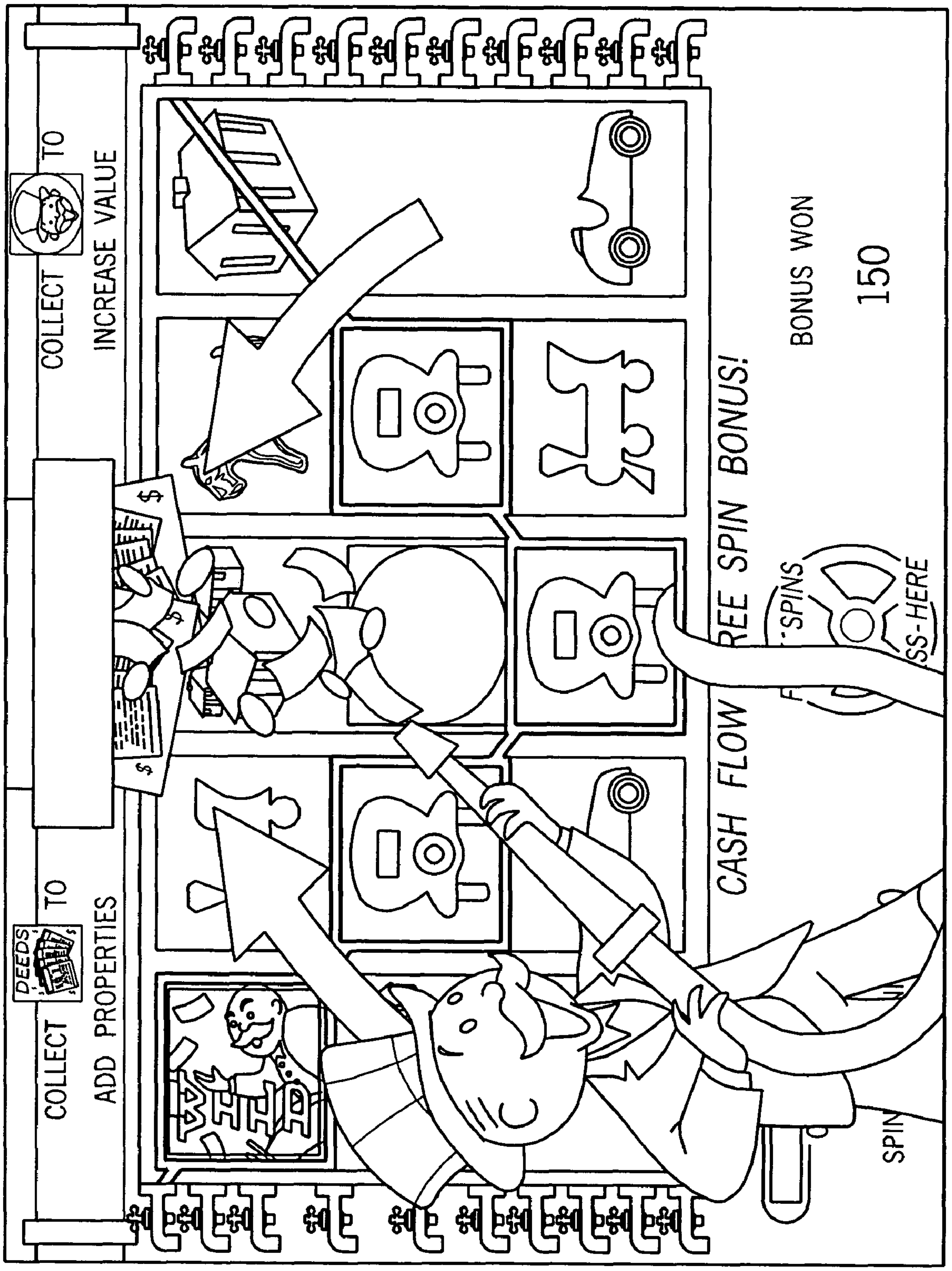
Figure 26:
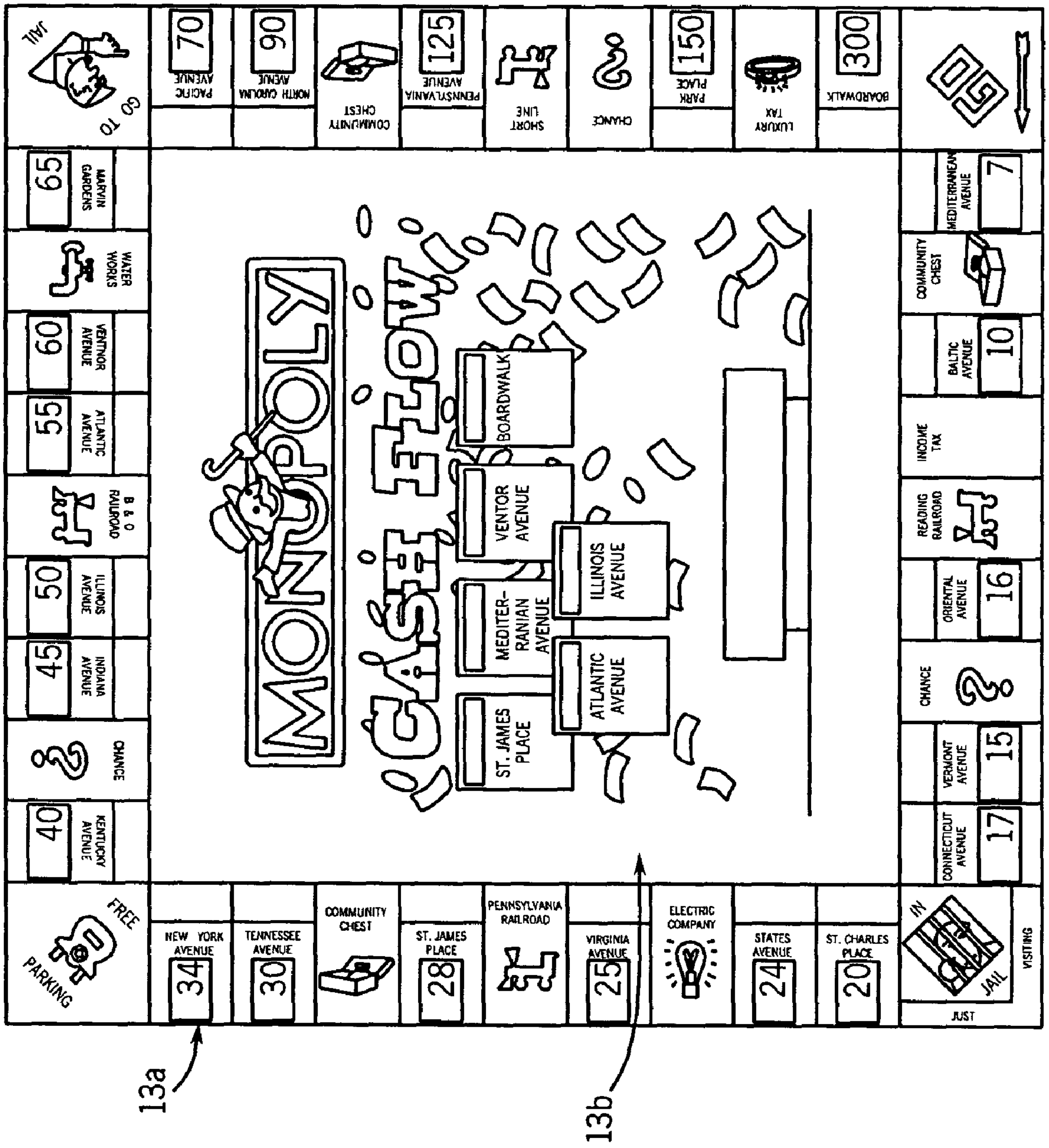

FIG. 24 moves forward in time to the last free spin, which yields (i) another line pay combination of four Free Parking symbols 72 (including one wild) worth 100 credits, (ii) two Deeds symbols 64, and (iii) a Mr. Monopoly symbol 66. Referring to FIG. 25, the Deeds symbols 64 "move up" to the secondary display 13 in FIG. 26 and randomly award a pair of properties, one for each Deeds symbol 64. Here, the player has been awarded Atlantic Avenue and Illinois Avenue. The awarded properties are shown on the video display 13*b* and highlighted on the game board 13*a*. As before, Mr. Monopoly "jumps out" of this symbol position and "sends" money up to the secondary display 13, thereby increasing the credit values of all the properties.

Figure 27:
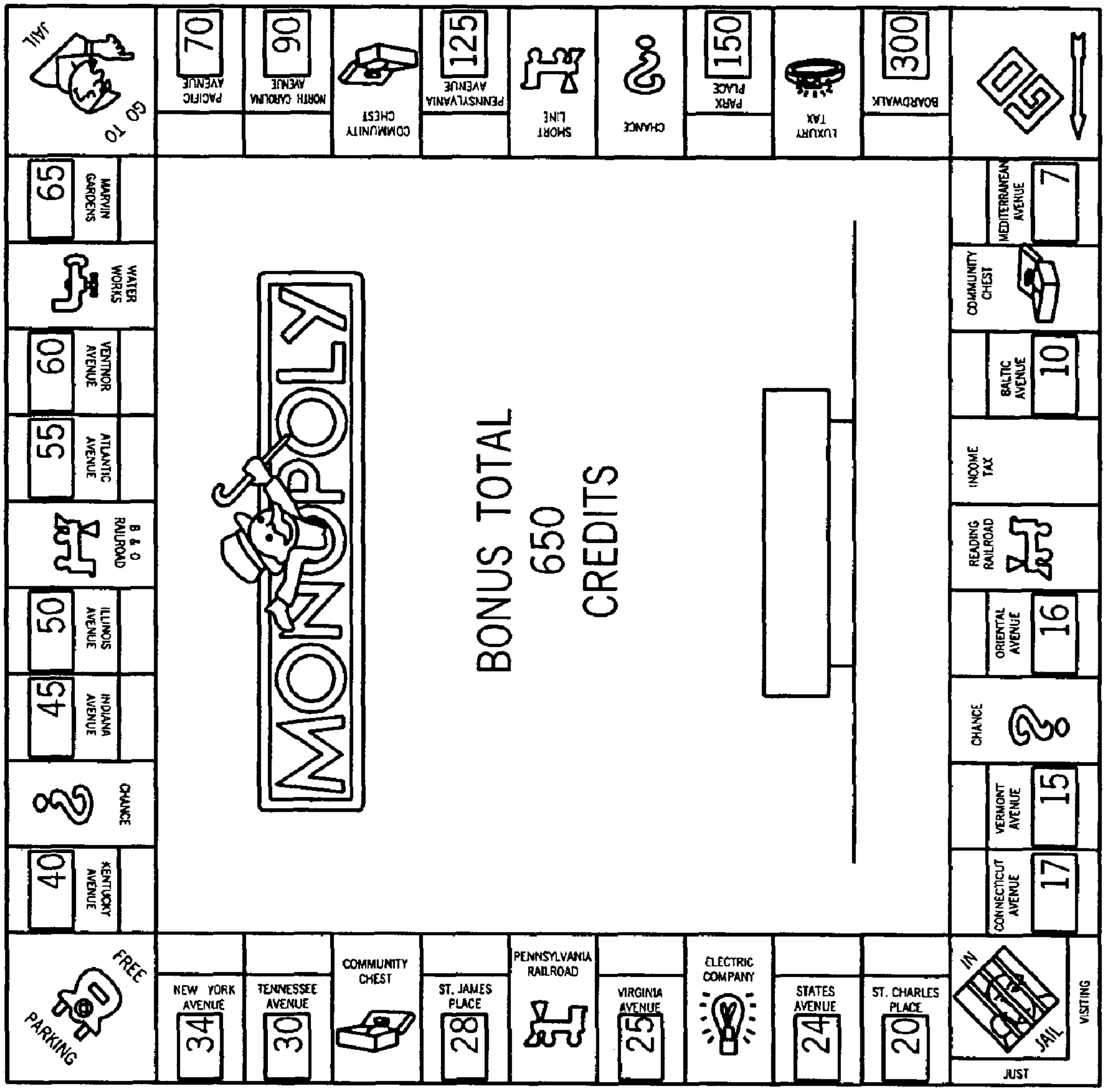

The bonus game ends when the player runs out of free spins. Referring to FIG. 27, at the end of the bonus game the credit values of all the collected properties are accumulated and awarded to the player. Here, the collected properties yield a total "property" bonus of 500 credits, comprised of 28 credits for St. James Place, 7 credits for Mediterranean Avenue, 60 credits for Ventor Avenue, 300 credits for Boardwalk, 55 credits for Atlantic Avenue, and 50 credits for Illinois Avenue. The line pays yield a total "winning symbol combination" bonus of 150 credits, comprised of a 30 credit line pay for the first free spin, a 20 credit line pay for the third free spin, and a 100 credit line pay for the fifth free spin. Therefore, in the illustrated example the bonus game yields a total bonus of 650 credits.

While the present invention has been described with reference to one or more particular embodiments, those skilled in the art will recognize that many changes may be made thereto without departing from the spirit and scope of the present invention.

For example, in the win multiplier feature one of the triggering reel symbols may be selected by the CPU without player involvement.

Also, the triggering symbols need not be along an active pay line in order to trigger the win multiplier feature; for example, the triggering symbols could be scattered.

Further, the win multiplier feature could be implemented in other games, such as video poker or a mechanical reel slot game, involving the display of a plurality of symbols. The feature could be implemented in a mechanical reel slot game by using, for example, a secondary display to indicate a multiplier associated with a selected triggering symbol. The button panel 14 may be used to select one of the triggering symbols.

Each of these embodiments and obvious variations thereof is contemplated as falling within the spirit and scope of the claimed invention, which is set forth in the following claims.

What is claimed is:

1. A method of conducting a slots game having a basic game and a special feature displayed within the basic game, the basic game including a paytable defining awards and winning symbol combinations associated with the respective awards, the method comprising:

receiving a wager to play the basic game in response to an input via at least one input device;

displaying on a display device a plurality of symbols along one or more paylines to indicate an outcome of the basic game;

and if the displayed plurality of symbols for the basic game includes one of the winning symbol combinations arranged along a first one of the paylines and meets a predetermined criterion, implementing via at least one processor the special feature within the basic game by:

associating multipliers with symbols within the winning symbol combination arranged along the first one of the paylines;

after associating multipliers with symbols within the winning symbol combination, selecting from the displayed plurality of symbols for the basic game one of the symbols of the winning symbol combination;

revealing the multiplier associated with the selected symbol;

multiplying, by the revealed multiplier, an award associated with the first one of the paylines; and awarding the multiplied award.

2. The method of claim 1, wherein the predetermined criterion includes that at least one of the symbols along the first one of the paylines of the winning symbol combination is a special symbol different than the other symbols of the winning symbol combination.

3. The method of claim 2, wherein the special symbol along the first one of the paylines is wild for the other symbols of the winning symbol combination.

4. The method of claim 1, wherein the selecting step is performed by a player.

5. The method of claim 1, wherein the selecting step is performed by the at least one processor processor without player involvement.

6. The method of claim 1, further including after the selecting step, revealing the multipliers associated with unselected ones of the symbols along the first one of the paylines of the winning symbol combination.

7. The method of claim 1, wherein all the symbols along the payline within the winning symbol combination are associated with multipliers.

8. A method of conducting a slots game having a basic game and a special feature displayed within the basic game, the method comprising:

receiving a wager to play the basic game in response to an input via at least one input device;

displaying on a display device a plurality of symbols along one or more paylines to indicate an outcome of the basic game;

and if the displayed plurality of symbols along one of the paylines yields a predetermined award and meets a predetermined criterion, implementing via at least one processor the special feature within the basic game by:

associating multipliers with symbols along the payline that yields the predetermined award;

after associating symbols with respective multipliers, selecting one of the symbols along the payline that yields the predetermined award;

revealing within the displayed plurality of symbols the multiplier associated with the selected symbol;

multiplying the predetermined award by the revealed multiplier; and awarding the multiplied predetermined award.

9. The method of claim 8, wherein the predetermined criterion includes that at least one of the symbols along the payline that yield the predetermined award is a special symbol different than the other symbols that yield the predetermined award.

10. The method of claim 9, wherein the special symbol along the payline is wild for the other symbols that yield the predetermined award.

11. The method of claim 10, wherein the special symbol along the payline transforms to appear like the other symbols that yield the predetermined award.

12. The method of claim 8, wherein the selecting step is performed by a player.

13. The method of claim 8, wherein the selecting step is performed by the at least one processor processor without player involvement.

14. The method of claim 8, further including after the selecting step, revealing the multipliers associated with unselected ones of the symbols along the payline that yields the predetermined award.

15. A gaming apparatus for conducting a slots game having a basic game and a special feature displayed within the basic game, the apparatus comprising:

a value input device for receiving a wager to play the basic game;

a display for displaying a plurality of symbols along one or more paylines to indicate an outcome of the basic game; and if the displayed plurality of symbols arranged along one of the paylines yields a predetermined award and meets a predetermined criterion, a processor operative to implement the special feature within the basic game by:

associating multipliers with the plurality of symbols along the payline that yields the predetermined award;

after associating the symbols along the payline with respective multipliers, selecting one of the symbols that yield the predetermined award;

causing the display to reveal within the displayed plurality of symbols the multiplier associated with the selected symbol;

multiplying the predetermined award by the revealed multiplier; and awarding the multiplied predetermined award.

16. The apparatus of claim 15, wherein the predetermined criterion includes that at least one of the symbols along the payline that yield the predetermined award is wild for the other symbols that yield the predetermined award.

17. The apparatus of claim 15, wherein the processor is operative to select the one of the symbols along the payline as directed by a player.

* * * * *